United States Patent
Waller, Jr. et al.

(10) Patent No.: US 10,988,827 B2
(45) Date of Patent: Apr. 27, 2021

(54) COALESCING ELEMENTS IN COPPER PRODUCTION

(71) Applicant: 3M INNOVATIVE PROPERTIES COMPANY, St. Paul, MN (US)

(72) Inventors: Clinton P. Waller, Jr., White Bear Lake, MN (US); Chetan P. Jariwala, Woodbury, MN (US); Jerald K. Rasmussen, Woodville, WI (US); John J. Schmidt, Eagan, MN (US); Michael J. Sierakowski, Stillwater, MN (US); Karl D. Weilandt, Meerbusch (DE)

(73) Assignee: 3M Innovative Properties Company, St. Paul, MN (US)

(*) Notice: Subject to any disclaimer, the term of this patent is extended or adjusted under 35 U.S.C. 154(b) by 401 days.

(21) Appl. No.: 15/558,697

(22) PCT Filed: Mar. 16, 2016

(86) PCT No.: PCT/US2016/022543
§ 371 (c)(1),
(2) Date: Sep. 15, 2017

(87) PCT Pub. No.: WO2016/149303
PCT Pub. Date: Sep. 22, 2016

(65) Prior Publication Data
US 2018/0112291 A1    Apr. 26, 2018

Related U.S. Application Data

(60) Provisional application No. 62/133,833, filed on Mar. 16, 2015.

(51) Int. Cl.
*C22B 3/26* (2006.01)
*B01D 17/04* (2006.01)
*C22B 15/00* (2006.01)

(52) U.S. Cl.
CPC ........ *C22B 15/0086* (2013.01); *B01D 17/045* (2013.01); *C22B 3/0005* (2013.01);
(Continued)

(58) Field of Classification Search
CPC .. C22B 3/0005; C22B 15/0086; B01D 17/045
See application file for complete search history.

(56) References Cited

U.S. PATENT DOCUMENTS

| 3,239,452 | A | | 3/1966 | Van Beest |
| 3,268,442 | A | * | 8/1966 | Pall ...................... B01D 17/045 |
| | | | | 210/702 |

(Continued)

FOREIGN PATENT DOCUMENTS

| CL | 199900326 | 10/1999 |
| WO | WO 2000-069549 | 11/2002 |

(Continued)

OTHER PUBLICATIONS

Ayres, "Stimuli-Responsive Surfaces Using Polyampholyte Polymer Brushes Prepared via Atom Transfer Radical Polymerization," Langmuir, Feb. 2007, vol. 23, pp. 3744-3749.

(Continued)

*Primary Examiner* — Vanessa T. Luk
(74) *Attorney, Agent, or Firm* — Kathleen B. Gross

(57) ABSTRACT

A coalescing element for aggregating droplets of an emulsion. The coalescing element includes a nonwoven web substrate. A coalescer that includes the coalescing element can also include a housing and a fluid inlet and a fluid outlet each in fluid communication with the coalescing element. The coalescing element and coalescer may be useful for emulsions that form in solvent extraction/electrowinning copper processing and for other emulsions.

20 Claims, 1 Drawing Sheet

(52) U.S. Cl.
CPC ...... *C22B 15/0065* (2013.01); *C22B 15/0071* (2013.01); *Y02P 10/20* (2015.11)

(56) References Cited

U.S. PATENT DOCUMENTS

| | | | |
|---|---|---|---|
| 3,285,705 | A | 11/1966 | Zuiderweg |
| 3,849,241 | A | 11/1974 | Butin |
| 4,069,119 | A | 1/1978 | Wong |
| 4,118,531 | A | 10/1978 | Hauser |
| 4,157,418 | A | 6/1979 | Heilmann |
| 4,437,994 | A | 3/1984 | Baker |
| 4,748,006 | A | 5/1988 | Fiocco |
| 4,936,934 | A | 6/1990 | Buehning |
| 5,273,654 | A * | 12/1993 | Severing ............ B01D 17/045 210/634 |
| 5,516,408 | A | 5/1996 | Peckham |
| 5,738,791 | A | 4/1998 | Schomaker |
| 5,820,653 | A | 10/1998 | Eamon |
| 5,879,556 | A * | 3/1999 | Hein ................. B01D 11/0457 210/634 |
| 6,015,502 | A | 1/2000 | Dzhragatspanvan |
| 6,230,776 | B1 | 5/2001 | Choi |
| 6,350,354 | B1 * | 2/2002 | Neuman ............... C22B 3/0005 204/233 |
| 6,645,618 | B2 | 11/2003 | Hobbs |
| 6,706,361 | B1 | 3/2004 | Economy |
| 6,995,222 | B2 | 2/2006 | Buckanin |
| RE39,399 | E | 11/2006 | Allen |
| 7,374,416 | B2 | 5/2008 | Cook |
| 7,695,625 | B2 | 4/2010 | Lyyra |
| 8,586,338 | B2 | 11/2013 | Etzel |
| 2002/0003110 | A1 | 1/2002 | Rohrbach |
| 2005/0137355 | A1 | 6/2005 | Buckanin |
| 2005/0249940 | A1 | 11/2005 | Klun |
| 2006/0163177 | A1 | 7/2006 | Johnson |
| 2010/0226823 | A1 | 9/2010 | Rakhman |
| 2012/0000853 | A1 | 1/2012 | Tuteja |
| 2012/0015002 | A1 | 1/2012 | Ali |
| 2012/0209014 | A1 | 8/2012 | Massingill |
| 2012/0292252 | A1 * | 11/2012 | Chase ................. B01D 46/003 210/634 |
| 2014/0014593 | A1 | 1/2014 | McGehee |
| 2014/0046029 | A1 | 2/2014 | Shannon |
| 2014/0163298 | A1 | 6/2014 | Kuzmin |
| 2014/0170313 | A1 * | 6/2014 | Jogikalmath .......... D21H 17/37 427/244 |

FOREIGN PATENT DOCUMENTS

| | | |
|---|---|---|
| WO | WO 2002-087734 | 11/2002 |
| WO | WO 2004-073843 | 9/2004 |
| WO | WO 2005-102503 | 11/2005 |
| WO | WO 2005-120676 | 12/2005 |
| WO | WO 2006-015495 | 2/2006 |
| WO | WO 2006-034575 | 4/2006 |
| WO | WO 2010-002501 | 1/2010 |
| WO | WO 2013-102005 | 7/2013 |
| WO | WO 2015-143155 | 9/2015 |
| WO | WO 2015-143262 | 9/2015 |
| WO | WO-2015143155 A1 * | 9/2015 ........... B01D 17/045 |

OTHER PUBLICATIONS

BASF, Standard quality control test of LIX® reagents, Aug. 2012, 3 pages.
"Coalescers: Bring down costs through advanced phase separation technology", Pall Corporation, Nov. 2012, pp. 01-16.
Cusack, "Rethink your liquid-liquid separations" Hydrocarbon processing, Jun. 2009, pp. 53-60.
Davies, The Separation of Airborne Dust and Particles, Proceedings of the Institution of Mechanical Engineers, Part B: Journal of Engineering Manufacture, vol. 1, No. 1-12, Jan. 1953, pp. 185-213.
Franken, "Wetting Criteria For The Applicability of Membrane Distillation," Journal of Membrane Science, 1987, vol. 33, No. 3, pp. 315-328.
Hoffmann, "Membrane Coalescence for Phase Separation of Oil-in-Water Emulsions Stabilized by Surfactants and Dispersed into Smallest Droplets," Chemical Engineering and Technology, Jan. 2001, vol. 24, No. 1, pp. 22-27.
Howarter, "Amphiphile Grafted Membranes for the Separation of Oil-in-Water Dispersions," Journal of Colloid and Interface Science, Jan. 2009, vol. 329, No. 1, pp. 127-132.
Hunter, "Liquid-Liquid Extraction Systems", Industrial and Engineering Chemistry, Jul. 1935, vol. 27, No. 07, pp. 836-845.
Kordosky, "Copper recovery using leach/solvent extraction/electrowinning technology: Forty years of innovation, 2.2 million tonnes of copper annually", The Journal of The South African Institute of Mining and Metallurgy, Nov./Dec. 2002, pp. 445-450.
Kota, "Hygro-Responsive Membranes for Effective Oil-Water Separation," Nature Communications, Aug. 2012, vol. 3:1025, pp. 1-8.
Miller, "Design Tools to Control Transients in Solvent Extraction Plants," SME Annual Meeting, Denver, Colorado, Feb. 2001, pp. 1-9.
Mohr, "Introduction to Separation of Oil and Water," Course No. EN-4021, PDHengineer.Com, 2001, pp. 1-29.
Morgan, "Entrainment Reduction at Freeport-McMoRan Copper & Gold Morenci Operations," Solvent Extraction and Ion Exchange, 2011, vol. 29, No. 5-6, pp. 854-867.
Nageshwar, "Coalescing Technology: An Overview", Chemical Engineering World, Jul. 2013, pp. 38_40_42.
Shin, "Water-in-Oil Coalescence in Micro-Nanofiber Composite Filters," American Institute of Chemical Engineers Journal, Feb. 2004, vol. 50, No. 2, pp. 343-350.
Tirmizi, "Demulsification of Water/Oil/Solid Emulsions by Hollow-Fiber Membranes," American Institute of Chemical Engineers Journal, May 1996, vol. 42, No. 5, pp. 1263-1276.
Wente, "Manufacture of Superfine Organic Fibers," Naval Research Laboratories Report No. 4364, May 25, 1954, 21 pages.
Wente, "Superfine Thermoplastic Fibers", Industrial Engineering Chemistry, Aug. 1956, vol. 48, No. 8, pp. 1342-1346.
Xue, "A Novel Superhydrophilic and Underwater Superoleophobic Hydrogel-Coated Mesh for Oil/Water Separation," Advanced Materials, Aug. 2011, vol. 23, No. 37, pp. 4270-4273.
International Search Report for PCT International Application No. PCT/US2016/022543, dated Apr. 27, 2016, 7 pages.

* cited by examiner

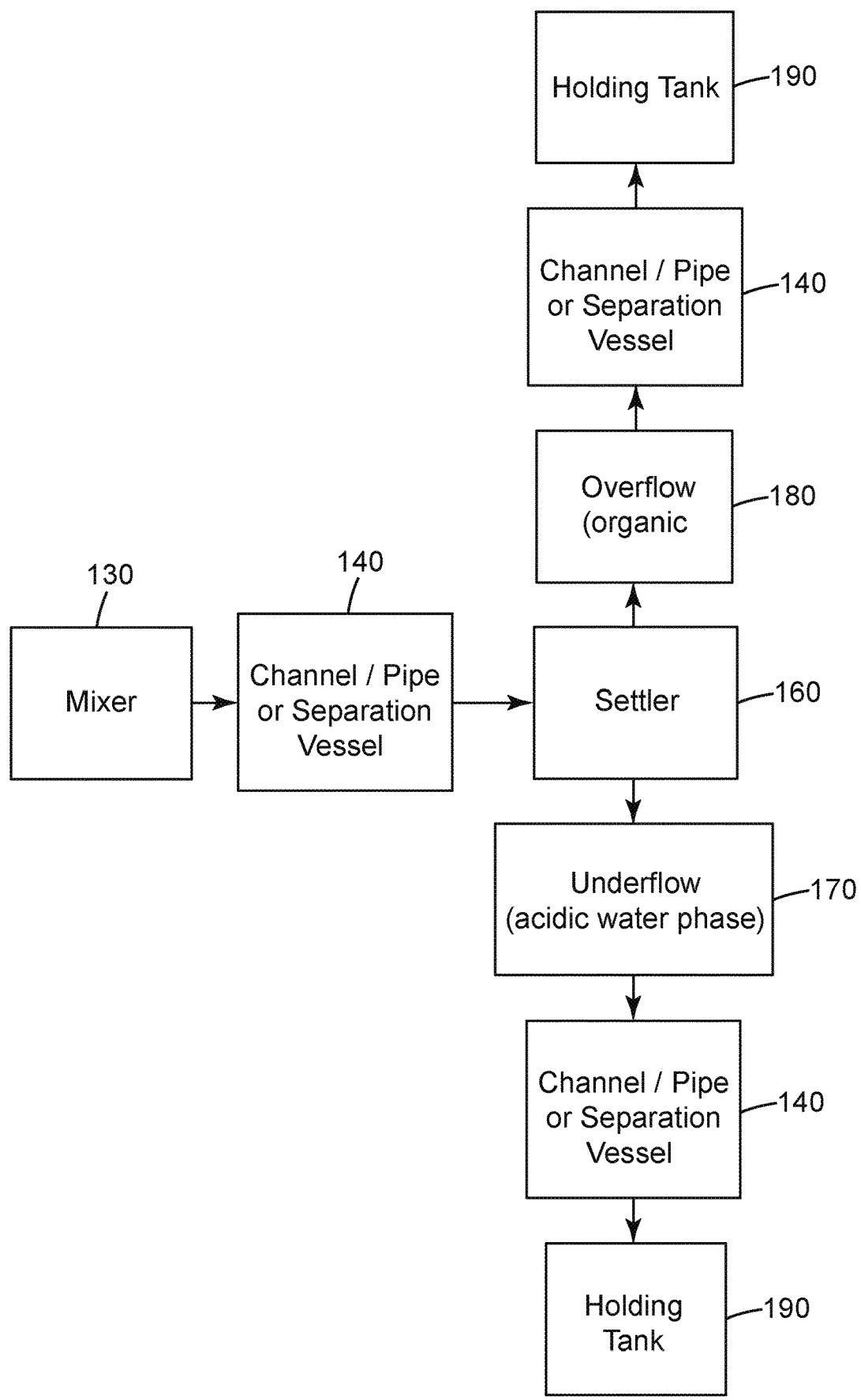

COALESCING ELEMENTS IN COPPER PRODUCTION

CROSS-REFERENCE TO RELATED APPLICATION

This application is a national stage filing under 35 U.S.C. 371 of PCT/US2016/022543, filed Mar. 16, 2016, which claims priority to U.S. Provisional Application No. 62/133,833, filed Mar. 16, 2015, the disclosure of which is incorporated by reference in its entirety herein.

FIELD

The present disclosure is directed to copper metal production. More particularly, the present disclosure is related to a method of breaking aqueous acid/organic solvent emulsions formed during the hydrometallurgical production of copper. More particularly this disclosure relates to droplet coalescers that aggregate droplets of an organic solvent discontinuous phase dispersed in an aqueous acid continuous phase and droplet coalescers that aggregate droplets of an acidic water discontinuous phase dispersed in an organic continuous phase. The coalescers have one or more nonwoven layers where droplets may aggregate or coalesce as the continuous phase flows through the nonwoven web.

BACKGROUND

In the hydrometallurgical production of copper there are three basic steps to the process: leaching, organic solvent extraction, and electrowinning. The second step, the solvent extraction (SX) of copper, provides an industrial-scale technique for the separation, purification and concentration of copper ions from the metal-bearing pregnant leach solution (PLS) recovered from the leach operation of low-grade copper oxide or sulfide ores. This is accomplished using a non-specific extraction by a dilute solution of sulfuric acid and enriching it to a high grade copper electrolyte solution utilizing the solvent extraction process. The copper concentration in the PLS typically ranges from 0.4 to over 4.0 grams per liter, but will also contain significant levels of iron and other undesired metal ions as a result of the leaching operation.

The SX process involves contacting the aqueous PLS with the solvent extraction organic, facilitating the extraction of copper ion from the PLS into the solvent extraction organic by the formation of a copper complex, which is both stable and soluble in the organic phase. This allows the loaded organic to separate from the aqueous phase leaving the unwanted metal ions behind in the aqueous phase. The now copper depleted aqueous solution (raffinate) is recycled back to the leaching circuit and the purification stage of solvent extraction has been achieved. This is referred to as the extract (E) stage of the SX process.

This concentration of the copper ions is carried out by extracting the aqueous copper ions into one of several different types of oxime-based extractants dissolved in a refined kerosene solvent. This combination is commonly referred to as the solvent extraction reagent. These extractants are very specific for copper within a certain concentration and pH range while the diluents/solvent acts a low viscosity carrier for the extractants. Mass transfer of the copper between the two immiscible phases occurs when the solutions are mixed to form a semi-stable emulsion. The emulsion passes into a settling vessel of sufficient size where the two phases are then allowed to separate utilizing their different solubilities and specific gravities.

Contacting and separation of the two immiscible phases is conducted in a series of mixer-settlers in the SX plant. A typical mixer-settler consists of an agitated tank (mixer or mix box) in which the aqueous and organic solutions are contacted, followed by a shallow gravity settling basin (settler) where the solutions disengage into individual layers for separate discharge. A common arrangement in modern SX plants consists of two cylindrical mix boxes and a rectangular settler. The settler is equipped with a full width distributor to spread the flow evenly across the width. This is followed by a picket fence, which serves to dampen solution movement in the settler.

The now copper-rich organic solution is advanced to another mixer settler to strip the copper back into an aqueous solution called electrolyte. The stripped organic solution is recycled back to the beginning of the extraction process. Stripping of the copper chelate occurs when a strongly acidic solution (e.g., spent electrolyte at 150 gpl acid) is mixed with the loaded organic copper complex. The complex releases its copper and takes on acid so that the level of copper in the aqueous solution (electrolyte) increases and the acid level decreases as copper transfers out of the organic phase and is replaced by acid. This is referred to as the strip stage (S) of the SX process. A typical copper SX plant will utilize a combination of extraction and strip stages mixer-settlers and will have at least two extraction stages and a single stripping stage.

After the aqueous and organic phases have been mixed and the extraction or stripping reactions are complete, and depending on the defined settler residence time, the two phases will separate normally as the organic is insoluble in the aqueous phase. Because the organic is lighter than both the PLS and electrolyte (i.e., approx. 1.10 kg/l and 1.2 kg/l respectively), the organic will be in the upper layer and will always float on top of the aqueous phase.

The time that is required for the organic and aqueous phase to separate is called the phase disengagement time (PDT). The phase disengagement time is an important criterion in SX plant operation as the settler size is designed such that there is sufficient residence time to allow the two phases to separate. If there is insufficient time in the settler for separation to occur (i.e., the phase disengagement time is greater than the settler residence time), then excessive amounts of entrainment in either the aqueous and organic phase can occur.

Fresh SX organic will typically have a phase disengagement time on the order of 30-60 seconds, while typical recycled SX plant organic may have phase disengagement times as long as 30-120 seconds. Any surface active materials which, if present during the mixing, can result in significant increases phase disengagement time. Examples of these materials are; chemical surfactants such as soaps, flocculants and degreasers; degraded organic products, or colloidal material. In addition, the combination of the mechanical mixers in conjunction with entrained air, colloidal solids, or wind-blown dust also promote the formation of a stable third phase in the settler, commonly known as crud, that is known to severely hinder phase disengagement in the settler.

In extreme cases, phase disengagement times in excess of 300 seconds may result and remedial action must be taken to stop further contamination from entering the circuit. It may also be necessary to clay treat the plant organic. When phase disengagement problems do occur, it may be necessary to slow the flow rate through the settler (i.e., decrease the plant flow rate). This decreased flow rate allows for an increase in the settler residence time and more time for the two phases to separate before they exit the settler. It will also have a very detrimental impact on overall plant productivity.

The mixing of the organic and aqueous phases can be done in one of two ways, either aqueous continuous or organic continuous depending on the relative volume of each in the mixer. Under normal conditions, if there is more organic than there is aqueous (e.g., an organic/aqueous ratio of at least 1.1 to 1), then the mixing will be organic continuous and vice versa.

When the phases have been mixed aqueous continuous, with a higher volume percent of the aqueous phase vs. the organic phase the phase disengagement time will tend to be more rapid than when the phases have been mixed in an organic continuous mode. The term organic continuous means that in the mixer there will be a continuous phase of organic solvent and dispersed through it a discreet aqueous phase. For aqueous continuous there is a continuous matrix of aqueous with discontinuous droplets of organic solvent phase.

The organic/aqueous (O/A) ratio of the phases in a mixer is typically between 1:1 to 1.5:1 in most commercial plants. It is usually achieved by recycling either the organic or aqueous phase from the settler to its mixer. An important reason for maintaining the optimum O/A ratio is to improve the mass transfer rate and stage efficiency. At the optimum O/A ratio the rate of coalescence and re-dispersion of the dispersed phase is enhanced.

Entrainment is a word used to describe the situation where a quantity of one phase, for example, the aqueous phase, remains in the organic phase when the organic phase exits the overflow weir in the settler. This example describes aqueous entrainment in organic. Organic entrainment in aqueous is when quantities of the organic remain with the aqueous phase as it exits the settler.

The major source of impurity transfer is via aqueous entrainment in the loaded organic discharging from the extract stage of the SX circuit. SX organic in the aqueous phase will incur increased operational costs either from the addition of fresh organic (reagent and diluents) or the reprocessing of recovered organic due to the hydrolytic or oxidative degradation of the SX organic. Similarly, loss of the SX organic from entrainment has the potential to expose the organic to oxidative conditions in the electrowinning tankhouse or in the raffinate pond that will eventually degrade it.

The use of mechanical agitation to produce the semi-stable emulsion or dispersion required for copper transfer commonly results in zones of high shear in the mixer generating a distribution of droplet size, including a certain percentage of some small droplets. These smaller droplets require substantially longer times to disengage than the normal residence time in the settler, causing their physical inclusion in the opposite, continuous phase and are a primary source of entrainment in the SX plant.

Phase separation in the mixer-settler is a very complex phenomenon and these are only a few of the many factors that can adversely influence coalescing rates. However, of the many factors affecting the draining and rupture of the droplet film and coalescing rates, probably the most important factor is the overall droplet size distribution. Droplet size has to be suitably large for coalescing, but it also has to be small enough so that mass transfer rate between the immiscible phases is high. Generally, increasing the droplet size at the interface of the continuous phase decreases the overall extraction rate.

Secondary droplet formation by droplet coalescence can occur if the droplet-droplet interfacial tension permits coalescence. It is the stability of these smaller droplets that is frequently the cause of the haze which forms at the phase boundary and which is usually very slow to coalesce.

Effective separation of organic solvent droplets from water or water droplets from organic solvents has commercial significance in hydrometallurgy applications. One of the keys for separating organic solvent droplets from water or water droplets from organic solvents is droplet size. Stokes' Law dictates that an immiscible droplet will settle (or rise) at a velocity that is inversely proportional to the square of the droplet diameter. For example, a 100 µm droplet will separate two orders of magnitude faster than a 10 µm droplet. Most hydrometallurgy unit operations depend on a gravity field to effect the separation.

Recognized sources of organic loss from the circuit include evaporation in addition to entrainment and degradation. While the mechanism and impact for organic losses are well known, similarly, productivity losses from aqueous entrainment and its carry through to the electrowinning operation are equally well known and recognized to have a significant impact on both the current efficiency of the EW operation and product quality of the finished copper cathode.

Improvements in SX circuit and mixer-settler design in addition to SX reagent and diluents stability have had a significant impact in decreasing the levels of organic and aqueous entrainment in the SX circuit. However, organic losses and productivity loss from contaminants in EW still remain as one of the most significant sources of operation costs to the mining operation.

Normal settler designs are square in plan and the phase separation takes place so that a dispersion is separated into aqueous and organic layers. The vertical position of the aqueous-organic interface is controlled by an adjustable weir at the far end of the settler. Typically, the settler unit will incorporate one or more sets of full-width baffles or series of baffles in a picket fence type of array. These are currently the most common types of in-settler features that, along with ensuring the flow rate to the settler is not too high, are the primary means of controlling entrainment levels in separated phases that reach the outlet of the settler.

Typical aqueous entrainment values experienced in the organic phase are in the range of 20 to 100 ppm, with organic entrainment raffinate values in a similar range. Again these values are affected by various other parameters, both physical and chemical.

SUMMARY

There is a need to provide efficient, compact, and cost-effective methods for handling and processing emulsions in copper hydrometallurgy. The use of a nonwoven web as a coalescing element offers the following advantages: provides a mechanism for droplet capture, allows for laminar and through-flow, is non-fouling, allows droplet coalescence of both organic solvent and aqueous phases, allows direct capture of small droplets, provides disruption of interfacial tension, and allows settling or separation of coalesced droplets.

In some embodiments, installation of a high-surface-area, low-pressure-drop, nonwoven web as the coalescing media at or near the discharge end of the settler would assist with the coalescence of both phases from the mixer emulsion, particularly the difficult-to-coalesce 40-micron-diameter-or-less droplets. The predominant improvement in solvent extraction circuit performance offered by the installation of the non-woven coalescing media would be the reduction in entrainment at the discharge end of the settler, both in the aqueous and organic phases.

As the mixer emulsion enters the settler, it may pass through a conventional baffled system, such as a picket fence system. The emulsion flows through this initial baffled zone, which occupies approximately the first quarter of the settler length. The effect of the picket fence is in smoothing out the flow allowing the phases to separate. The nonwoven web coalescing elements may in one embodiment comprise or consist of several layers running the entire width of the settler, and placed vertically from bottom to top of the settler, allowing the single unit to have media capable of handling entrainment in both the aqueous and organic phase. Additionally, the nonwoven web coalescing elements may in one embodiment comprise or consist of several layers running the entire width of the settler, and placed vertically in only one phase or the other allowing media capable of handling entrainment in either the aqueous phase or the organic phase discretely.

The increase in contact surface area of the entrained PLS or the SX organic in the settler would impact both losses of the SX organic and minimize the transfer of aqueous contaminants to the electrolyte without adverse effects on the plant flow rates. Modifications to existing plant equipment would be minimal due to the fact that most current mixer settler designs allow for the adjustment of the placement of multiple picket fences.

A device or element that coalesces discontinuous droplets into larger sizes will make industrial unit operations for separation more efficient and effective, resulting in increased throughput, capital avoidance, and reduction in the use of chemicals. In addition, the likelihood of violating discharge conditions is decreased and fewer production interruptions are expected. Upon coalescence of droplets to a diameter size of several hundred microns or even millimeter size, they can easily be separated by gravity alone. For example, droplets having a diameter in the range of less than 50 μm (e.g., 1-50 μm, 20-50 μm and/or smaller than 10 μm) can be coalesced and removed. Reduction of organic solvent content by up to 99% may be achieved, with a corresponding reduction in solution turbidity. Because this is primarily a coalescing device and not a filter, at steady state, the average amount of each of organic and aqueous entering the coalescer is the same as the average amount exiting it. Thus, devices and elements provided herein have industrial utility in treating emulsions from hydrometallurgical operations, as well as recovering the organic chelators and solvents used for copper recovery in solvent extraction (SX) processing common in hydrometallurgical mining.

Provided are droplet coalescers and systems that utilize the droplet coalescers, and methods of making and using the same.

In a first aspect, a coalescer is provided for aggregating droplets of an emulsion that includes a discontinuous phase dispersed in a continuous phase. The coalescer includes a housing; a coalescing element located in the housing; and a fluid inlet and a fluid outlet each in fluid communication with the coalescing element. The coalescing element comprises a nonwoven web substrate through which the emulsion passes. Either an organic solvent or an acidic aqueous phase may be the continuous phase.

Another aspect provides a system for aggregating droplets of an emulsion that includes a discontinuous phase dispersed in a continuous phase. The system includes a source of the emulsion; a coalescer that receives the discontinuous phase dispersed in a continuous phase, which may be any embodiment of a coalescer disclosed herein; a fluid inlet and a fluid outlet each in fluid communication with the coalescing element; and a process tank that receives flow from the coalescer. Either organic solvent or an acidic aqueous phase may be the continuous phase.

The system may further comprise a pre-filter that receives the discontinuous phase dispersed in a continuous phase from the source and supplies a filtered flow to the coalescer.

An additional aspect is a method for aggregating droplets of an emulsion including a discontinuous phase dispersed in a continuous phase. The method includes contacting with a feed of the emulsion any embodiment of a coalescer disclosed herein. a fluid inlet and a fluid outlet each in fluid communication with a coalescing element comprising at least one layer of a nonwoven web substrate; wherein the $D_{50}$ droplet particle size is bigger by at least a factor of 3 upon flow out of the fluid outlet relative to the $D_{50}$ droplet particle size upon flow into the fluid inlet. Droplet particle size may be measured by laser light scattering, and other means known in the art. Either the organic solvent or the acidic aqueous phase may be the continuous phase.

A further aspect is a method of making a coalescer, the method comprising: forming a coalescing element comprising a nonwoven web, a fluid flow path normal to the plane of a nonwoven web; locating the coalescing element in a housing; and providing or forming a fluid inlet and a fluid outlet to the flow path.

The coalescing element may comprise a plurality of nonwoven layers in a stacked relation. The coalescing element may comprise a one or more nonwoven layers in a spiral-wound configuration.

The nonwoven web may be hydrophilic, hydrophobic, or amphiphilic. The nonwoven web may have at least two regions of different wettablilities, wherein a first region is hydrophilic, hydrophobic, or amphiphilic and a second region is hydrophobic, amphiphilic, or hydrophilic while having a different wettability from the first region.

In an SX/EW process, copper-containing ore is leached with dilute acid, typically sulfuric acid at pH about 2, to non-selectively extract the metals from the ore. This leachate is the extracted with a commercial chelating agent or "lixiviant" in an organic solvent, similar to kerosene. The lixiviant solution selectively binds and extracts the desired copper into the organic phase. The organic phase, known as the pregnant lixiviant or loaded organic, is then contacted with a more concentrated acid solution, typically concentrated sulfuric acid at pH less than about 1. This aqueous extraction extracts the copper into the concentrated acid. In either of the extraction step where water and the organic phase are in contact, emulsions result. These emulsions may be directed to flow through the coalescer of this disclosure so that the dispersed phases contact the coalescing element so that the dispersed droplets coalesce and separate.

Accordingly, in another aspect, the present disclosure provides a method for producing copper which comprises:
a) providing a leachate containing copper ions in dilute acid, generally dilute sulfuric acid;
b) contacting the leachate with an organic solvent solution of lixiviant whereby the copper is extracted by the lixiviant to produce a pregnant lixiviant;
c) contacting the pregnant lixiviant solution with a concentrated acid solution to extract the copper from the lixiviant solution; and
coalescing the droplets from the emulsions that result from steps b) and/or c) by contacting with a nonwoven web.

As used herein:

A "coalescing element" is a module of the coalescer, comprising at least one nonwoven web layer. The coalescing element is located in a housing to produce a "coalescing article" that has mechanical strength, and usually the housing is pressure-rated to endure conditions during industrial use. The coalescing element is replaced as needed.

"Wettability" means a characteristic of a material by reference to what liquids are capable of wetting or maintain contact with the structure. Thus, the specific characteristics of hydrophilicity, hydrophobicity, oleophilicity, oleophobicity, and amphiphilicity describe the wettability of a material.

"Hydrophilic" refers to a material that is wettable by water, which is the continuous phase in an oil-in-water emulsion, but the discontinuous phase in a water-in-oil emulsion. Water generally has a contact angle of less than 90° with hydrophilic materials. Examples of such structures are hydrophilic by virtue of the materials used to fabricate the layer and/or by treatment.

"Hydrophobic" refers to a material that is not wettable by water. Water generally has a contact angle of 90° or greater with hydrophobic materials. Examples of such structures are hydrophobic by virtue of the materials used to fabricate the layer and/or by treatment.

"Oleophilic" refers to a material that is wettable by oil. Oil generally has a contact angle of less than 90° with oleophilic materials. Examples of such structures are oleophilic by virtue of the materials used to fabricate the layer and/or by treatment. For the purposes of this disclosure, materials that are oleophilic are also hydrophobic.

"Oleophobic" refers to a material that is not wettable by oil. Oil generally has a contact angle of 90° or greater with oleophobic materials. Examples of such structures are oleophobic by virtue of the materials used to fabricate the layer and/or by treatment. For the purposes of this disclosure, materials that are oleophobic are also hydrophilic.

"Amphiphilic layer" refers to a material that is wettable by both oil and water. Examples of such structures are amphiphilic by virtue of the materials used to fabricate the layer and/or by treatment.

"Combination layers" may provide designs of different hydrophobic, hydrophilic, and/or amphiphilic regions in the same layer.

BRIEF DESCRIPTION OF THE DRAWINGS

FIG. 1 is a flow schematic of a system utilizing a coalescing article.

DETAILED DESCRIPTION

Provided are droplet coalescers, or coalescing articles, and systems that utilize the droplet coalescers, and methods of making and using the same. The coalescers comprise a coalescing element located in a housing or frame, the coalescing element comprising at least one nonwoven web. There are a fluid inlet and outlet in fluid communication with the coalescing element such that the emulsion flows through the nonwoven web. Such nonwoven webs may be stacked or spiraled together alone or with other layers, some of which may provide additional functionality such as spacing and/or flow enhancement.

In operation, nominally small droplets entering a coalescing element agglomerate upon contact with the surface of the nonwoven web, thereby forming droplets of a larger size. For example, droplets generally agglomerate such that the $D_{50}$ droplet particle size is bigger, by for example at least a factor of 3 (or 10 or 100), upon flow out of the fluid outlet relative to the $D_{50}$ droplet particle size upon flow into the fluid inlet. Specifically, the droplets wick into or wet the fibers of the nonwoven web, and then move downstream with the flow. Residence time in the coalescing element is inversely related to flow rate and directly related to the fluid path through the nonwoven web and the surface area, which are designed as needed for particular applications. As the droplets progress through the web, they coalesce into larger droplets. These larger droplets (>100 µm) easily separate from the continuous phase due to Stokes' Law, often in a settling tank without further assistance.

The coalescers may be used in copper SX process, where coalescence of organic solvent oil-phase droplets from water or water-phase droplets from SX organic will facilitate operations. For example, coalesced droplets would lead to easier separation in downstream operations. In mining, the use of a coalescer would allow for recovery of the valuable organic that is either lost or collected from a raffinate pond, where expensive re-processing is subsequently required. The coalescers disclosed herein can accommodate large amounts of flow at low pressure drop (up to 20,000 liters/$m^2$/hr at less than 5 psig), which means that the coalescers are a practical technical solution that fit into existing operational demands, such as hydraulics requirements of a SX process.

The nonwoven web may be formed from any suitable thermoplastic polymeric material. Suitable polymeric materials include, but are not limited to, polyolefins, poly(isoprenes), poly(butadienes), fluorinated polymers, chlorinated polymers, polyamides, polyimides, polyethers, poly(ether sulfones), poly(sulfones), poly(vinyl acetates), polyesters such as poly(lactic acid), copolymers of vinyl acetate, such as poly(ethylene)-co-poly(vinyl alcohol), poly(phosphazenes), poly(vinyl esters), poly(vinyl ethers), poly(vinyl alcohols), and poly(carbonates). The polymer used in forming the nonwoven web may be inherently hydrophilic or hydrophobic, and may be further comprise a grafted (co) polymer to alter the relative hydrophilicity/hydrophobicity or surface energy. In some embodiments, the nonwoven web substrate comprises fibers of inherently hydrophilic polymers. In some embodiments, these inherently hydrophilic polymers comprise at least one of a polyamide or poly(vinyl alcohol).

Suitable polyolefins include, but are not limited to, poly (ethylene), poly(propylene), poly(1-butene), copolymers of ethylene and propylene, alpha olefin copolymers (such as copolymers of ethylene or propylene with 1-butene, 1-hexene, 1-octene, and 1-decene), poly(ethylene-co-1-butene) and poly(ethylene-co-1-butene-co-1-hexene).

Suitable fluorinated polymers include, but are not limited to, poly(vinyl fluoride), poly(vinylidene fluoride), copolymers of vinylidene fluoride (such as poly(vinylidene fluoride-co-hexafluoropropylene), and copolymers of chlorotrifluoroethylene (such as poly(ethylene-co-chlorotrifluoroethylene).

Suitable polyamides include, but are not limited to, poly (iminoadipoyliminohexamethylene), poly(iminoadipolyliminodecamethylene), and polycaprolactam. Suitable polyimides include, but are not limited to, poly(pyromellitimide).

Suitable poly(ether sulfones) include, but are not limited to, poly(diphenylether sulfone) and poly(diphenylsulfone-co-diphenylene oxide sulfone).

Suitable copolymers of vinyl acetate include, but are not limited to, poly(ethylene-co-vinyl acetate) and such copolymers in which at least some of the acetate groups have been hydrolyzed to afford various poly(vinyl alcohols).

Suitable polyesters include those commonly made by condensation polymerization of hydroxyl-containing monomers and/or oligomers (e.g., chain extenders such as glycols and the like) with poly-acid-containing or poly-ester-containing monomers and/or oligomers (e.g., dicarboxylic acids or diesters such as terephthalic acid, naphthalene dicarboxylate, etc.). It should be noted that such polyesters may be made from poly-acids, or from any ester-forming equivalents of such materials (e.g., from any materials that can be polymerized to ultimately provide a polyester, such as hydroxy acid, including poly(lactic acid). Other useful polyesters include the aliphatic polyesters described in U.S. Pat. No. 6,645,618 (Perez et al.), incorporated herein by reference.

As used herein, the term "nonwoven web" refers to a fabric that has a structure of individual fibers or filaments which are randomly and/or unidirectionally interlaid in a mat-like fashion.

For example, the fibrous nonwoven web can be made by wet laid, carded, air laid, spunlaced, spunbonding or meltblowing techniques or combinations thereof. Spunbonded fibers are typically small diameter fibers that are formed by extruding molten thermoplastic polymer as filaments from a plurality of fine, usually circular capillaries of a spinneret with the diameter of the extruded fibers being rapidly reduced. Meltblown fibers are typically formed by extruding the molten thermoplastic material through a plurality of fine, usually circular, die capillaries as molten threads or filaments into a high velocity, usually heated gas (e.g. air) stream which attenuates the filaments of molten thermoplastic material to reduce their diameter. Thereafter, the meltblown fibers are carried by the high velocity gas stream and are deposited on a collecting surface to from a web of randomly dispersed meltblown fibers. Spunlacing uses high-speed jets of water to strike a web to intermingle the fibers of the web. Spunlacing is also known as hydroentangling and can be carried out on fibrous webs made, for example, using carded webs and air-laid webs.

Further details on the manufacturing method of nonwoven webs useful for practicing the present disclosure may be found in Wente, Superfine Thermoplastic Fibers, 48 INDUS. ENG. CHEM. 1342(1956), or in Wente et al., Manufacture Of Superfine Organic Fibers, (Naval Research Laboratories Report No. 4364, 1954). Useful methods of preparing the nonwoven substrates are described in U.S. RE 39,399 (Allen), U.S. Pat. No. 3,849,241 (Butin et al.), U.S. Pat. No. 7,374,416 (Cook et al.), U.S. Pat. No. 4,936,934 (Buehning), and U.S. Pat. No. 6,230,776 (Choi), each incorporated herein by reference.

In some embodiments the nonwoven web is grafted with one or more grafting monomers to alter the surface characteristics thereof. The grafting monomers can graft (i.e. forming a covalent bond) to the surface of the base substrate when exposed to an ionizing radiation preferably e-beam or gamma radiation. That is, reaction of (meth)acryloyl groups of the grafting monomers with the surface of the nonwoven web substrate in the presence of the ionizing radiation results in the (co)polymer being directly grafted to the base substrate via the (meth)acrylate group.

The grafting methods of the present disclosure involve the irradiation of nonwoven web substrates with ionizing radiation to prepare free radical reaction sites on such substrates upon which the functional monomers are grafted. "Ionizing radiation" means radiation of a sufficient dosage and energy to cause the formation of free radical reaction sites on the surface(s) of the polymeric nonwoven web. Ionizing radiation may include beta, gamma, electron-beam, x-ray and other electromagnetic radiation. In some instances, corona radiation can be sufficiently high energy radiation. In some embodiments, the ionizing radiation comprises ionizing e-beam or gamma radiation. The radiation is sufficiently high energy, that when absorbed by the surfaces of the nonwoven web substrate, sufficient energy is transferred to that substrate to result in the cleavage of chemical bonds in that substrate and the resultant formation of a free radical site on the substrate. The incipient free radicals on the surface initiates free radical polymerization of the monomers. One or more layers of nonwoven substrates may be subjected to the ionizing radiation.

The method of grafting a ligand (co)polymer to the surface of the substrate alters the original nature of the nonwoven web substrate, as the substrate bears a grafted (co)polymer. The resulting grafted (co)polymer substrates has many of the advantages of a base nonwoven substrate (e.g., mechanical and thermal stability, porosity), but with enhanced properties such as wettability, surface energy, clog resistance and flux.

The process of preparing the grafted nonwoven substrate comprises the steps of providing a nonwoven substrate, imbibing the exposed substrate with a solution comprising grafting monomers (as described below), and exposing the nonwoven substrate to ionizing radiation in an inert atmosphere, to graft polymerize said monomers to the surface of the nonwoven substrate. The imbibing step and irradiation can be done in either order.

In the imbibing step, the nonwoven substrate is contacted with the imbibing solution containing one or more grafting monomers. Suitable methods of imbibing include, but are not limited to, a spray coating, flood coating, knife coating, Meyer bar coating, dip coating, and gravure coating.

If irradiated prior to imbibing, the imbibing solution remains in contact with the nonwoven substrate for a time sufficient for the radical sites to initiate polymerization with the grafting monomers. When imbibed with a solution of monomers, grafting reactions are mostly completed after 12 hours exposure; generally resulting in >50% conversion of monomers to grafted polymer. As a result, the nonwoven substrate comprises grafted polymers and/or copolymers attached to the interstitial and outer surfaces of the nonwoven substrate.

The imbibing solution may comprise one or more grafting monomers suitable for grafting onto surfaces of the nonwoven substrate. Any of the exemplary grafting monomers described herein can be included in the imbibing solution. In addition to the described grafting monomers, the imbibing solution can contain other materials such as, for example, one or more other non-grafting monomers for UV curing, surfactants, dyes, pigments and solvents.

The concentration of each grafting monomer in the imbibing solution may vary depending on a number of factors including, but not limited to, the grafting monomer or monomers in the imbibing solution, the extent of grafting desired, the reactivity of the grafting monomer(s), and the solvent used. Typically, the total concentration of the monomers in the imbibing solution ranges from about 1 wt % to about 100 wt %, desirably, from about 5 wt % to about 30 wt %, and more desirably from about 15 wt % to about 25 wt % based on a total weight of the imbibing solution.

The imbibing solution may further comprise an aqueous blend of an organic solvent and the grafting monomer(s). In some embodiments, the organic solvent is a water-miscible organic solvent.

It has been found that the solvent blend influences the morphology of the grafted polymer and the resulting flux rate. The ratio of water to organic solvent can vary widely, but is typically greater than 1:1 (v/v) water to organic solvent, preferably greater than 5:1, and more preferably greater than 7:1. The ratios are generally adjusted so that the resulting grafted nonwoven substrate has the requisite hydrophilicity, surface energy and/or wettability to effectively coalesce the dispersed droplets of the emulsion.

The concentration of the organic solvent in water may be optimized with respect to the fiber size of the nonwoven substrate. In general, the optimum concentration of organic solvent increases as the fiber size decreases.

It is believed that by adjusting the amount of organic solvent in the imbibing solution a greater amount of monomer is grafted to the nonwoven substrate without bridging the fibers of the substrate and closing the voids. If the web voids are bridged, the nonwoven dries to a translucent appearance, and has decreased flux and reduced ability to expand on hydration. The smaller the fibers the less monomer it takes to bridge the pores of the nonwoven. Adding more organic solvent reduces the bridging, allows for increased grafted polymer content (as a function of weight percent of the nonwoven substrate) and allows for freer expansion of the article.

Any such organic solvent typically has no tertiary hydrogen atoms, or other groups that would retard the graft polymerization. In some embodiments, the water miscible solvents are protic group containing organic liquids such as the lower alcohols having 1 to 4 carbon atoms, lower glycols having 2 to 6 carbon atoms, and most preferably lower glycol ethers having 3 to 6 carbon atoms and 1 to 2 ether linkages. In some embodiments higher glycols such as poly(ethylene glycol) may be used. Specific examples are methanol, ethanol, n-butanol, t-butyl alcohol, ethylene glycol, methoxyethanol, ethoxyethanol, propoxyethanol, butoxyethanol, methyl carbitol, ethyl carbitol, and mixtures thereof.

In other embodiments, non-protic organic solvents that can also be used such as aliphatic esters and ketones and sulfoxides such as ethyl acetate, propyl acetate, butyl acetate, methoxyethyl acetate, ethoxyethyl acetate, propoxyethyl acetate, butoxyethyl acetate, triethyl phosphate, acetone, methyl ethyl ketone, methyl propyl ketone, and dimethyl sulfoxide.

In the irradiation step the nonwoven substrate is exposed to ionizing radiation, such as e-beam radiation, in an inert atmosphere. Generally, the substrate is placed in a chamber purged of oxygen. Typically, the chamber comprises an inert atmosphere such as nitrogen, carbon dioxide, helium, argon, etc., with a minimal amount of oxygen (less than 100 ppm), which is known to inhibit free-radical polymerization.

Electron beam is one useful method of grafting due to the ready-availability of commercial sources. Electron beam generators are commercially available from a variety of sources, including the ESI "ELECTROCURE" EB SYSTEM from Energy Sciences, Inc. (Wilmington, Mass.), and the BROADBEAM EB PROCESSOR from PCT Engineered Systems, LLC (Davenport, Iowa). For any given piece of equipment and irradiation sample location, the dosage delivered can be measured in accordance with ASTM E-1275 entitled "Practice for Use of a Radiochromic Film Dosimetry System." By altering extractor grid voltage, beam diameter and/or distance to the source, various dose rates can be obtained.

In the irradiation step the nonwoven substrate is exposed to a sufficient quantity of ionizing radiation, so as to form free radicals on the surfaces of the nonwoven substrate. The chamber may contain at least one device capable of providing a sufficient dose of radiation. A single device is capable of providing a sufficient dose of radiation, although two or more devices, and/or multiple passes through a single device, may be used especially for relatively thick nonwoven substrates.

Dose is the total amount of energy absorbed per mass unit. Dose is commonly expressed in units of kiloGray (kGy). A gray is defined as the amount of radiation required to supply 1 joule of energy per kilogram of mass. The total dose received by the substrate depends on a number of parameters including source activity, residence time (i.e., the total time the sample is irradiated), the distance from the source, and attenuation by the intervening cross-section of materials between the source and sample. Dose is typically regulated by controlling residence time, distance to the source, or both.

Generally, it was found that doses in the range of less than about 100 kGy were suitable for generating the grafted (co)polymer. Total dose requirement for any given composition will vary as a function of desired grafting objectives, monomer selected, substrate used, and the dose rate. Thus, a dose rate can be selected based on desired properties for a specified composition. The dose rate is typically in the range of 0.0005 kGy/sec (gamma) to 200 kGy/sec (E-beam).

Other sources of irradiation may be used with equal grafting performance; a desirable source of ionizing radiation comprises an electron beam source because the electron beam can produce high and fast dose delivery rates. Electron beams (e-beams) are generally produced by applying high voltage to tungsten wire filaments retained between a repeller plate and an extractor grid within a vacuum chamber maintained at about $10^{-6}$ Torr. The filaments are heated at high current to produce electrons. The electrons are guided and accelerated by the repeller plate and extractor grid towards a thin window of metal foil. The accelerated electrons, traveling at speeds in excess of $10^7$ meters/second (m/sec) and possessing about 100 to 300 kilo-electron volts (keV), pass out of the vacuum chamber through the foil window and penetrate whatever material is positioned immediately beyond the foil window.

The quantity of electrons generated is directly related to the current. As extractor grid voltage is increased, the acceleration or speed of electrons drawn from the tungsten wire filaments increase. E-beam processing can be extremely precise when under computer control, such that an exact dose and dose rate of electrons can be directed against the nonwoven substrate.

The temperature within the chamber is desirably maintained at an ambient temperature by conventional means. Without intending to be limited to any particular mechanism, it is believed that the exposure of the nonwoven substrate to an electron beam results in free radical sites on the substrate surface which can then subsequently react with the grafting monomers in the imbibing step.

The total dose received by the nonwoven substrate primarily affects the number of radical sites formed on the surface thereof and subsequently the extent to which the grafting monomers are grafted onto the nonwoven substrate. Dose is dependent upon a number of processing parameters, including voltage, web- or line-speed and beam current. Dose can be conveniently regulated by controlling line speed (i.e., the speed with which the nonwoven substrate passes under the irradiation device), and the current supplied to the extractor grid. A target dose (e.g., <10 kGy) can be conveniently calculated by multiplying an experimentally measured coefficient (a machine constant) by the beam current and dividing by the web speed to determine the exposure. The machine constant varies as a function of beam voltage.

While the controlled amount of electron beam radiation exposure is dependent upon the residence time, the nonwoven substrate is subjected to a controlled amount of dosage ranging from a minimum dosage of about 1 kilogray (kGy) to a practical maximum dosage of less than about 200 kGy, depending on the particular polymer. For radiation sensitive polymers such as propylene polymers the amount typically ranges from a minimum dosage of about 1 kilogray (kGy) to a maximum dosage of less than about 10 kGy. Typically, the total controlled amount of dosage ranges from less than about 9 kGy to about 7 kGy for propylene polymers to avoid degradation. Less radiation sensitive polymers such as nylons or PVDF may be subjected to higher dosages, typically 10 to 70 kGy.

Generally, suitable gamma ray sources emit gamma rays having energies of 400 keV or greater. Typically, suitable gamma ray sources emit gamma rays having energies in the range of 500 keV to 5 MeV. Examples of suitable gamma ray sources include cobalt-60 isotope (which emits photons with energies of approximately 1.17 and 1.33 MeV in nearly equal proportions) and cesium-137 isotope (which emits photons with energies of approximately 0.662 MeV). The distance from the source can be fixed or made variable by changing the position of the target or the source. The flux of gamma rays emitted from the source generally decays with the square of the distance from the source and duration of time as governed by the half-life of the isotope.

Where irradiation precedes imbibing, the irradiated substrate, having free radical sites on the surface of the nonwoven substrate, is imbibed with the monomer solution subsequent to and not concurrent with, the irradiation step. The free radical sites generated on the surface of the nonwoven substrate have average lifetimes ranging from several minutes to several hours and progressively decay to a low concentration within about ten hours at room temperature. Lower temperatures, such as dry ice temperatures, promote longer radical lifetimes.

Generally, the irradiated nonwoven substrate is imbibed with the monomer solution immediately after the irradiation step. When using e-beam the irradiated substrate is imbibed within an hour, in some cases, within ten minutes. Generally, when using gamma irradiation, the substrate should be imbibed immediately after irradiation since irradiation residence time will be long. It has been observed that if the substrate is irradiated by ionizing radiation in the presence of the grafting monomers, the performance of the grafted nonwoven substrate is inferior, presumably due to less grafted (co)polymer.

Once grafted, the nonwoven substrate bearing grafted (co)polymer groups may be optionally rinsed to remove residual monomer and/or dried. In the optional rinsing step, the functionalized nonwoven substrate is washed or rinsed one or more times to remove any unreacted monomers, solvent or other reaction by-products. Typically, the functionalized substrate is washed or rinsed up to three times using a water rinse, an alcohol rinse, a combination of water and alcohol rinses, and/or another solvent rinse (e.g., acetone, methyl ethyl ketone, etc). When an alcohol rinse is used, the rinse may include one or more alcohols including, but not limited to, isopropanol, methanol, ethanol, or any other alcohol that is practical to use and an effective solvent for any residual monomer. In each rinse step, the functionalized substrate may pass through a rinse bath or a rinse spray. In some embodiments, the rinse may comprise an ionic buffer solution that would reduce swelling of the nonwoven substrate, the amount of retained water, and also avoiding weakening the nonwoven substrate during this rinse step.

In the optional drying step, the grafted nonwoven substrate is dried to remove any rinse solution. Typically, the grafted nonwoven substrate is dried in oven having a relatively low oven temperature for a desired period of time (referred to herein as "oven dwell time"). Oven temperatures typically range from about 60 C to about 120 C, while oven dwell times typically range from about 120 to about 600 seconds. Any conventional oven may be used in the optional drying step. It should also be noted that in other embodiments the drying step can proceed before the rinsing step to eliminate volatile components before extraction of non-grafted residue. Following the optional drying step, the dried grafted nonwoven substrate can be taken up in roll form to be stored for future use The grafting monomers may comprise hydrophilic monomers to render the nonwoven more hydrophilic. Hydrophilic monomers include cationic monomer, anionic monomer and nonionic hydrophilic monomers, such as poly(ethylene glycol) (meth)acrylate. The hydrophilic monomer are categorized assuming neutral pH, and regardless of the state of protonation, e.g. acid-functional monomers are considered anionic due to ionization at neutral pH, but are protonated at low pH.

The anionic monomer has at least one ethylenically unsaturated group capable of undergoing free radical polymerization and an anionic functional group. In some embodiments, the ethylenically unsaturated group is a (meth)acryloyl group or a vinyl group. The anionic monomer can be a weak acid, a strong acid, a salt of a weak acid, a salt of a strong acid, or combinations thereof. That is, the ionic monomer can be in a neutral state but capable of being negatively charged if the pH is adjusted. The counter ions of these salts can be, but are not limited to, alkali metals, alkaline earth metals, ammonium ions, or tetraalkylammonium ions. As the emulsion is acidic, weak and strong acids groups are protonated.

Anionic (meth)acryloyl monomers may have the general formula:

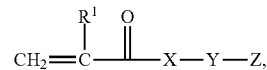

where
$R^1$ is H or $CH_3$;
X is —O— or —$NR^1$—,
Y is a straight or branched chain alkylene, generally from 1 to 10 carbon atoms; and
Z is an anionic group, which may be selected from sulphonic acid groups, phosphonic acid groups, and carboxylic acid groups, and salts thereof.

Some examples of anionic monomers include (meth) acrylamidosulfonic acids of Formula (II) or salts thereof:

where $R^1$ is H or $CH_3$, and Y is a straight or branched alkylene having 1 to 10 carbon atoms. Examples of ionic monomers according to Formula (II) include, but are not limited to, N-acrylamidomethanesulfonic acid, 2-acrylamidoethanesulfonic acid, 2-acrylamido-2-methylpropanesulfonic acid, and 2-methacrylamido-2-methylpropanesulfonic acid. Salts of these acidic monomers can also be used, examples being (3-sulfopropyl)-methacrylic acid potassium salt and 2-(methacryloyloxy)ethylsulfonic acid sodium salt.

Other suitable anionic monomers for the graft polymer include sulfonic acids such as vinylsulfonic acid and 4-styrenesulfonic acid; (meth)acrylamidophosphonic acids such as (meth)acrylamidoalkylphosphonic acids (e.g., 2-acrylamidoethylphosphonic acid and 3-methacrylamidopropylphosphonic acid); acrylic acid and methacrylic acid; and carboxyalkyl(meth)acrylates such as 2-carboxyethylacrylate, 2-carboxyethylmethacrylate, 3-carboxypropylacrylate, and 3-carboxypropylmethacrylate. Still other suitable acidic monomers include (meth)acryloylamido acids, such as those described in U.S. Pat. No. 4,157,418 (Heilmann), incorporated herein by reference. Examples of (meth)acryloylamido acids include, but are not limited to, N-acryloylglycine, N-acryloylaspartic acid, N-acryloyl-β-alanine, 2-acrylamidoglycolic acid, and 3-acrylamido-3-methylbutyric acid.

Some exemplary ionic grafting monomers that are capable of providing a positive charge are amino (meth) acrylates or amino (meth)acrylamides of Formula IV or quaternary ammonium salts thereof. The counter ions of the quaternary ammonium salts are often halides, sulfates, phosphates, nitrates, and the like.

where L is oxy or $-NR^1-$, where $R^1$ is H or $C_1$-$C_4$ alkyl; $R^3$ is H or $CH_3$, and Y is an alkylene (e.g. an alkylene having 1 to 10 carbon atoms, 1 to 6, or 1 to 4 carbon atoms). Each $R^5$ is independently hydrogen, alkyl, hydroxyalkyl (i.e. an alkyl substituted with a hydroxy), or aminoalkyl (i.e. an alkyl substituted with an amino). Alternatively, the two $R^5$ groups taken together with the nitrogen atom to which they are attached can form a heterocyclic group that is aromatic, partially unsaturated (i.e. unsaturated but not aromatic), or saturated, wherein the heterocyclic group can optionally be fused to a second ring that is aromatic (e.g. benzene), partially unsaturated (e.g. cyclohexene), or saturated (e.g. cyclohexane).

It will be understood with respect to Formula IV that the grafting (meth)acrylate group may be replaced by another ethylenically unsaturated group capable of graft polymerization, such as methacrylate, (meth)acrylamide, vinyl, vinyloxy, ally, alloxy, and acetylenyl for subsequent incorporation during ionizing radiation-initiated polymerization.

In some embodiments of Formula IV, both $R^5$ groups are hydrogen. In other embodiments, one $R^5$ group is hydrogen and the other is an alkyl having 1 to 10, 1 to 6, or 1 to 4 carbon atoms. In still other embodiments, at least one of $R^5$ groups is a hydroxy alkyl or an amino alkyl that have 1 to 10, 1 to 6, or 1 to 4 carbon atoms with the hydroxy or amino group being positioned on any of the carbon atoms of the alkyl group. In yet other embodiments, the $R^5$ groups combine with the nitrogen atom to which they are attached to form a heterocyclic group. The heterocyclic group includes at least one nitrogen atom and can contain other heteroatoms such as oxygen or sulfur. Exemplary heterocyclic groups include, but are not limited to imidazolyl. The heterocyclic group can be fused to an additional ring such as a benzene, cyclohexene, or cyclohexane. Exemplary heterocyclic groups fused to an additional ring include, but are not limited to, benzoimidazolyl.

Exemplary amino (meth)acrylates (i.e. L in Formula IV is oxy) include N,N-dialkylaminoalkyl acrylates such as, for example, N,N-dimethylaminoethylacrylate, N,N-dimethylaminoethylmethacrylate, N,N-diethylaminoethyl acrylate, N,N-diethylaminoethylmethacrylate, N,N-dimethylaminopropylacrylate, N,N-dimethylaminopropylmethacrylate, N-tert-butylaminopropylmethacrylate, N-tert-butylaminopropylacrylate, and the like.

Examples of amino (meth)acrylamides, that would be subsequently incorporated during the radiation-initiated polymerization, (i.e. L in Formula IV is $-NR^1-$) include, for example, N-(3-aminopropyl)methacrylamide, N-(3-aminopropyl)acrylamide, N-[3-(dimethylamino)propyl]methacrylamide, N-[3-(dimethylamino)propyl]acrylamide, N-(3-imidazolylpropyl)methacrylamide, N-(3-imidazolylpropyl) acrylamide, N-(2-imidazolylethyl)methacrylamide, N-(2-imidazolylethyl)acrylamide, N-(1,1-dimethyl-3-imidazoylpropyl)methacrylamide, N-(1,1-dimethyl-3-imidazoylpropyl)acrylamide, N-(3-benzoimidazolylpropyl) acrylamide, and N-(3-benzoimidazolylpropyl) methacrylamide.

Examples of quaternary salts of the ionic monomers of Formula IV include, but are not limited to, (meth)acrylamidoalkyltrimethylammonium salts (e.g. 3-methacrylamidopropyltrimethylammonium chloride and 3-acrylamidopropyltrimethylammonium chloride) and (meth)acryloxyalkyltrimethylammonium salts (e.g. 2-acryloxyethyltrimethylammonium chloride, 2-methacryloxyethyltrimethylammonium chloride, 3-methacryloxy-2-hydroxypropyltrimethylammonium chloride, 3-acryloxy-2-hydroxypropyltrimethylammonium chloride, and 2-acryloxyethyltrimethylammonium methyl sulfate).

Other monomers that can provide positively charged groups to the grafted polymer include the dialkylaminoalkylamine adducts of alkenylazlactones (e.g. 2-(diethylamino)ethylamine, (2-aminoethyl)trimethylammonium chloride, and 3-(dimethylamino)propylamine adducts of vinyldimethylazlactone) and diallylamine monomers (e.g. diallylammonium chloride and diallyldimethylammonium chloride). Alternatively, azlactone monomers may be functionalized with aminoalkanols as described in US 20140046029 (Rasmussen et al.), incorporated herein by reference.

In some embodiments, the cationic monomer may be an agmatine monomer of Formula V:

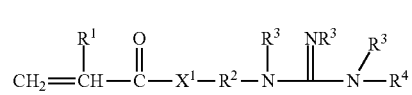

wherein $R^1$ is H or $C_1$-$C_4$ alkyl;

$R^2$ is a divalent alkylene, preferably having 1 to 20 carbon atoms and optionally containing an ester, amide, urethane or urea linking group;

each $R^3$ is independently H or $C_1$-$C_4$ alkyl;

$R^4$ is H, $C_1$-$C_4$ alkyl or $-N(R^3)_2$; and $X^1$ is $-O-$ or $-NR^3-$. The nonwoven web may be directly- or indirectly grafted with the agmatine monomer of Formula V, as further described in U.S. Pat. No. 8,586,338 (Rasmussen et al.), incorporated herein by reference.

In general, the monomers having the requisite cationic, anionic or nonionic groups may be graft polymerized per se, or may be indirectly grafted by graft polymerizing a monomer having a reactive functional group, such as a isocyanate group or an azlactone group, then subsequently functionalizing the grafted polymer with the requisite anionic, cationic or nonionic group. For example, the nonwoven web may be grafted with isocyanatoethylmethacrylate to yield a graft (co)polymer having pendent isocyanate groups. This (co)polymer may be subsequently functionalized with agmatine sulfate to provide a grafted (co)polymer with pendent agmatine groups. As a second example, the nonwoven may be grafted with vinyl dimethylazlactone (VDM) and subsequently reacted with an amino-alcohol to produce a grafted (co)polymer having pendent amine groups. This indirect grafting and functionalization is described in U.S. Pat. No. 8,586,338 (Rasmussen et al.).

The grafted polymer optionally contains monofunctional ethylenically-unsaturated grafting monomer units having a poly(alkylene oxide) group. These monomers copolymerize with the grafting anionic monomers to form a grafted copolymer chain on the surface of the nonwoven substrate. When present, these monomers are used in amounts of 2 to 20 wt. %, more preferably 5 to 10 wt. %, relative to the total monomer weight.

The monomer units having a poly(alkylene oxide) group is of the formula:

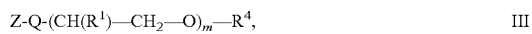

wherein Z is a polymerizable ethylenically unsaturated moiety, R is a H or $CH_3$, $R^4$ is a H, a $C_1$ to $C_4$ alkyl group, aryl group, or combinations thereof and m is from 2 to 100, in some embodiments, 5 to 20, and Q is a divalent linking group selected from —O—, —$NR^1$—, —$CO_2$— and —$CONR^1$.

In one embodiment, the poly(alkylene oxide) group is a poly(ethylene oxide) (co)polymer. In another embodiment, the pendent poly(alkylene oxide) group is a poly(ethylene oxide-co-propylene oxide) copolymer. Such copolymers may be block copolymers, random copolymers, or gradient copolymers.

Useful ethylenically unsaturated moiety, Z, of the monomer may include:

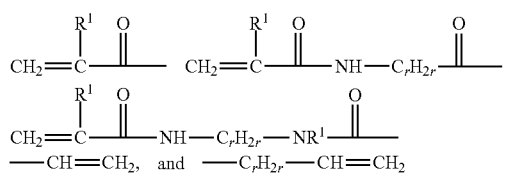

wherein $R^1$ is H or Me and r=1-10.

Examples of suitable monofunctional poly(alkylene oxide) monomers include poly(ethylene oxide) (meth)acrylate, poly(propylene oxide) (meth)acrylate, poly(ethylene oxide-propylene oxide) (meth)acrylate, and combinations thereof. In some embodiments, such monomers include one nonreactive end group such as ($C_1$-$C_4$) alkoxy, aryloxy (e.g., phenoxy), and ($C_1$-$C_4$) alkaryloxy. These groups can be linear or branched. These monomers can be of a wide range of molecular weights and are commercially available from sources such as Sartomer Company, Exton, Pa.; Shinnakamura Chemical Co., Ltd., Tokyo, Japan; Aldrich, Milwaukee, Wis.; and Osaka Organic Chemical Ind., Ltd., Osaka, Japan.

The grafted polymer optionally contains other ethylenically-unsaturated hydrophilic grafting monomer units having a water miscibility (water in monomer) of at least 1 wt. %, in some embodiments at least 5 weight % without reaching a cloud point, are exclusive of poly(alkylene oxide) monomers and contain no groups that would retard the grafting polymerization.

Examples of suitable hydrophilic monomers include 2-hydroxyethyl(meth)acrylate (HEMA), 2-hydroxypropyl (meth)acrylate, 3-hydroxypropyl(meth)acrylate, 2, 3-dihydroxypropyl (meth)acrylate, 4-hydroxybutyl(meth)acrylate, N-vinyl caprolactam, N-vinyl acetamide, N-vinyl pyrrolidone, acrylonitrile, tetrahydrofurfuryl acrylate, acrylamide, mono- or di-N-alkyl substituted acrylamide, glycerol methacrylate, glycidyl (meth)acrylate, and combinations thereof. In some embodiments, the hydrophilic monomers include 2-hydroxyethyl(meth)acrylate (HEMA), N-vinyl pyrrolidone, N-vinyl acetamide, methylacrylamide, glycidyl (meth)acrylate and mixtures thereof.

The nonwoven webs may be rendered hydrophobic and/or oleophobic by graft polymerization of a fluorine-containing monomer. In particular, the nonwoven substrate may be grafted with a poly(hexafluoropropylene oxide) monomer (and other comonomers), such as is described U.S. 2005/0249940 (Klun) and US 2012/0015002 (Ali et al.), incorporated herein by reference. Other useful poly(hexafluoropropylene oxide) monomers (HFPO monomers) and copolymers with other monomers is described in U.S. Pat. No. 6,995,222 (Buckanin et al.) incorporated herein by reference.

The nonwoven web substrates useful for practicing the present disclosure typically have an effective fiber diameter of from about 0.5 to 40 micrometers, in some embodiments, from about 0.5 to 30 micrometers, 0.5 to 25 micrometers, 1 to 20 micrometers, 1 to 15 micrometers, or 1 to 10 micrometers, as calculated according to the method set forth in Davies, C. N., "The Separation of Airborne Dust and Particles," Institution of Mechanical Engineers, London, Proceedings 1B, 1952.

In some embodiments, the nonwoven web substrate includes fibers that have different effective fiber diameters. In other words, fibers in the same web or same layer of the nonwoven web substrate may have different effective fiber diameters. In some embodiments, the coalescing element disclosed herein comprises two or more nonwoven layers in a stacked relation. In some embodiments, the coalescing element disclosed herein comprises one or more nonwoven layers in a spiral-wound configuration. In some of these embodiments, at least two of the two or more layers of nonwoven webs have different effective fiber diameters. As shown in Table 4 in the Examples, below, in some embodiments, a mixture of effective fiber diameters in the nonwoven web substrate can more effectively reduce the turbidity of an emulsion than when the same effective fiber diameter is used throughout the nonwoven web substrate.

The nonwoven substrate preferably has a basis weight in the range of about 10 to 400 g/m², more preferably about 10 to 100 g/m². The average thickness of the nonwoven substrate is preferably about 0.1 to 100 mm, more preferably about 0.25 to 5 mm for the non-functionalized, uncalendared nonwoven web. The minimum tensile strength of the nonwoven web is about 4.0 Newtons. It is generally recognized that the tensile strength of nonwovens is lower in the machine direction than in the cross-web direction due to better fiber bonding and entanglement in the latter.

Nonwoven web loft is measured by solidity, a parameter that defines the solids fraction in a volume of web. Lower solidity values are indicative of greater web loft. Useful nonwoven substrates have a solidity of less than 50%, preferably less than 25%. Solidity is a unitless fraction typically represented by a:

$$\alpha = m_f \div \rho_f \times L_{nonwoven}$$

where $m_f$ is the fiber mass per sample surface area, which $\rho_f$ is the fiber density; and $L_{nonwoven}$ is the nonwoven thickness. Solidity is used herein to refer to the nonwoven substrate itself and not to the grafted nonwoven. When a nonwoven substrate contains mixtures of two or more kinds of fibers, the individual solidities are determined for each kind of fiber using the same $L_{nonwoven}$ and these individual solidities are added together to obtain the web's solidity, $\alpha$.

As an example, the nonwoven substrate (before calendering or grafting) preferably has an average pore size of 5-50 μm. The term "average pore size" (also known as average pore diameter) is related to the arithmetic median fiber diameter and web solidity and can be determined by the following formula: where D is the average pore size, $d_f$ is arithmetic median fiber diameter, and $\alpha$ is the web solidity.

$$D = d_f \left\{ \left(\frac{2\alpha}{\pi}\right)^{-1/2} - 1 \right\}$$

In some embodiments the nonwoven substrate preferably has a mean pore size of 1-40 microns, preferably 2-20 microns. Mean pore size may be measured according to ASTM F 316-03 "Standard Test Methods for Pore Size Characteristics of Membrane Filters by Bubble Point and Mean Flow Pore Test Method B" using Freon TF™ as the test fluid.

In some embodiments, useful nonwoven webs with have a surface energy of at least 35 dyne/cm, preferably at least 40 dynes/cm, more preferably at least 45 dyne/cm. The surface energy of a substrate may be measured using the Penetrating Drop method, whereby a series of test solutions of increasing surface tension is applied to the samples until a solution of such high surface tension is used that it no longer penetrates the nonwoven web substrate. The critical wetting surface tension of the samples may be measured using Dyne Test Solutions™ available from Jemmco LLC., Mequon Wis. 53092 (general test method disclosed in Journal of Membrane Science, 33 (1987) 315-328 Wetting Criteria For The Applicability of Membrane Distillation). A series of test solutions of increasing surface tension is applied to the samples until a solution of such high surface tension is used that it no longer penetrates the substrate.

In other embodiments the nonwoven web is rendered hydrophobic and/or oleophobic by grafting a fluorine-containing monomer to produce a grafted nonwoven web having a surface energy of <35 dynes/cm.

Other useful hydrophobic monomers include styrene, alkyl (meth)acrylates, fluorinated olefins, fluoroalkyl-containing monomers and fluoro-ether-containing monomers, including poly(hexafluoroproylene oxide) containing monomers.

In some embodiment the nonwoven web has a surface area of 15 to 50 m² per square meter of nonwoven substrate The nonwoven webs useful for practicing the present disclosure can exhibit various degrees of wettability upon exposure to various solutions or solvents. Wettability can often be correlated to the hydrophilic character of the hydrophilic substrate. As used herein, the term "instant wet" or "instant wettability" refers to the penetration of droplets of water into a given substrate as soon as the water contacts the substrate surface, typically within less than 1 second. For example, a surface wetting energy of greater than 30 dynes/cm or larger usually results in wetting. As used herein, the term "no instant wet" refers to penetration of droplets of water into a given substrate but not as soon as the water contacts the substrate surface. As used herein, the term "no wetting" refers to the lack of penetration of droplets of water into a given substrate.

Alternatively, the wettability may be measured by the Wettability Test described herein where the nonwoven web is challenged with an acidic solution, which may be pre-wetted.

In some embodiments the nonwoven web has a Gurley Stiffness of at least about 100 mg, and may have a Gurley Stiffness before pleating of at least about 200 mg, at least about 300 mg, at least about 400 mg, at least about 600 mg or at least about 1000 mg. Gurley Stiffness may be determined using a Model 4171E GURLEY™ Bending Resistance Tester from Gurley Precision Instruments.

Desirably, the nonwoven web is acid stable, and is not degraded when subject to the low pH conditions of the emulsions. Desirably, the fibers of the nonwoven web do not swell in contact with either the acid solutions or the organic solvents used in the process.

Staple fibers may also be present in the web. The presence of staple fibers generally provides a loftier, less dense web than a web of only melt blown microfibers. In some embodiments, no more than about 20 weight percent staple fibers are present, in some embodiments, no more than about 10 weight percent. Such webs containing staple fiber are disclosed in U.S. Pat. No. 4,118,531 (Hauser), incorporated herein by reference.

The nonwoven article may optionally further comprise one or more layers of scrim. For example, either or both major surfaces may each optionally further comprise a scrim layer. The scrim, which is typically a woven or nonwoven reinforcement made from fibers, is included to provide strength to the nonwoven article. Suitable scrim materials include, but are not limited to, nylon, polyester, fiberglass, and the like. The average thickness of the scrim can vary. Typically, the average thickness of the scrim ranges from about 25 to about 100 micrometers, preferably about 25 to about 50 micrometers. The layer of the scrim may optionally be bonded to the nonwoven article. A variety of adhesive materials can be used to bond the scrim to the polymeric material. Alternatively, the scrim may be heat-bonded to the nonwoven.

When used in a SX applications, one or more layers of the nonwoven web may be used, each of which layers may have the same, or different average void or pore size, void volume, degree of polymer grafting, monomer composition of grafted polymer, porosity, tensile strength and surface area. In some embodiments, each subsequent layer may be the same or different. The nonwoven web substrate may be configured in any desirable shape. In some embodiments the nonwoven substrate may be pleated. Pleated grafted nonwoven coalescing elements may be combined as multiple concentric pleated elements. The nonwoven substrate may be wound spirally. Further, the nonwoven substrate may be encapsulated with a porous web to provide support and aid in handling. In SX applications, the nonwoven substrate may be disposed either vertically, or horizontally so long as the fluid may flow therethrough, and with sufficient contact time to effect the coalescence.

In one embodiment, the coalescing element comprises an ungrafted polypropylene nonwoven web.

In one embodiment, the coalescing element comprises an ungrafted nylon web.

In one embodiment, the coalescing element comprises a polypropylene web grafted with a quaternary ammonium monomer.

In one embodiment, the coalescing element comprises a polypropylene web grafted with a sulfonic acid monomer.

In one embodiment, the coalescing element comprises a polypropylene web grafted with a quaternary ammonium monomer and a sulfonic acid monomer.

In one embodiment, the coalescing element comprises a polypropylene web grafted with a poly(ethylene glycol) monomer.

In one embodiment, the coalescing element comprises a polypropylene web grafted with a glycidyl (meth)acrylate monomer.

In one embodiment the coalescing element comprises a polypropylene web grafted with 50-70 pbw N-vinyl pyrrolidone, 20-30 pbw Maptac, and 10-20 pbw AMPS, the total being 100 pbw.

In one embodiment the coalescing element comprises a polypropylene web grafted with 40-60 pbw N-vinyl pyrrolidone, 25-35 pbw glycidyl methacrylate, and 25-35 pbw of a VDM-ethanolamine adduct, the total being 100 pbw.

In one embodiment the coalescing element comprises a polypropylene web grafted with N-vinyl formamide.

In one embodiment the coalescing element comprises a polypropylene web grafted with 40-60 pbw N-vinyl pyrrolidone, 20-30 pbw glycidyl methacrylate, and 5-20 pbw of a hydroxyethylacrylamide, the total being 100 pbw.

In one embodiment the coalescing element comprises a polypropylene web grafted with N-vinyl pyrrolidone.

In one embodiment the coalescing element comprises a polypropylene web grafted with 20-30 pbw N-vinyl pyrrolidone, 20-30 pbw glycidyl methacrylate, and 40-60 pbw AMPS, the total being 100 pbw.

In one embodiment the coalescing element comprises a polypropylene web grafted with 30-50 pbw N-vinyl pyrrolidone, 10-20 pbw glycidyl methacrylate, and 40-60 pbw MAPTAC, the total being 100 pbw.

In one embodiment the coalescing element comprises a polypropylene web grafted with 50-70 pbw N-vinyl pyrrolidone, 20-30 pbw MAPTAC, and 10-20 pbw AMPS, the total being 100 pbw.

In one embodiment the coalescing element comprises a polypropylene web grafted with 50-70 pbw N-vinyl pyrrolidone, 20-30 pbw MAPTAC, 10-20 pbw AMPS, and 1 to 10 pbw HFPO-MA, the total being 100 pbw.

In one embodiment the coalescing element comprises a polypropylene web grafted with 40-60 pbw N-vinyl pyrrolidone, 20-30 pbw glycidyl methacrylate, and 20-40 pbw IEM-Agmatine, the total being 100 pbw.

The coalescing elements of the present disclosure desirable will achieve a percent reduction in turbidity of at least 90% (1−initial/final in NTUs) according to the Turbiditity Test measurements. Preferably the reduction is at least 95%, more preferably at least 97%

Suitable materials for housing the coalescing elements have mechanical strength, providing adequate structure to withstand at least a desired rigidity, pressure rating and/or assembly into an industrial setting. Housings may comprise a supporting frame to which is attached one or more layers of the nonwoven web, and which maintain the substantial planar orientation of the nonwoven web (or layers of such nonwoven webs) relative to the flow of the emulsion. In some embodiments, the housing of the coalescing element may be the conventional mixers or settlers used in SX processes. In some embodiments the housing may be the exit pipe for the aqueous and/or the organic solvent streams. The housings may be "pressure-rated" to withstand pressures greater than atmospheric.

In practice, the coalescers or coalescing articles provided herein are included in a system that handles emulsions, particularly acidic emulsions of the SX production of copper. Output of the coalescers may be supplied to any desirable process tank of any purpose that is a part of the overall emulsion handling system, usually a separator tank. Typically, the output of the coalescers, like that of the settling tanks, are recycled into the process streams.

Turning to FIG. 1: In practice, the coalescers or coalescing elements provided herein are included in a solvent exchange system (shown in FIG. 1). The acidic water phase and the organic phase are mixed in the mixer 130. The output flows via a channel or pipe or separating vessel (140) to the settler (160). The phases are allowed to separate in the settler (160). The acidic water phase flows underneath an underflow (170) whereas the organic passes over an overflow (180). From there both liquid streams pass through another channel or pipe or separating vessel (140) to respective holding tanks (190). Embodiments of this disclosure are to locate the coalescing element(s) in the settler (160) and/or in the different channels, pipes or separating vessels (140).

The coalescers may be used in SX applications at locations where emulsions form such as in mixers upstream of settling tanks. Thus, the coalescer would receive flow from one or more mixers. This coalescer could also be positioned at points further downstream or even within the settler. For such applications, it is noted that fouling challenges may be present and there may be a need for ancillary equipment such as a pre-filter upstream of the coalescer.

Coalescence of organic-phase droplets from water or water-phase droplets from organic phase will facilitate operations of downstream equipment in the SX process.

Some Embodiments of the Disclosure

In a first embodiment, the present disclosure provides a method for producing copper, the method comprising:
a) providing an aqueous solution containing copper in dilute acid;
b) contacting the aqueous solution with a solution of lixiviant whereby the copper is extracted by the lixiviant to produce a loaded organic solution;
c) contacting the loaded organic solution with concentrated acid solution to extract the copper from the loaded organic solution into the concentrated acid solution,
wherein at least one of b) or c) provides an emulsion, the method further comprising:
contacting at least one of the loaded organic solution or the concentrated acid solution with a coalescing element comprising a nonwoven web substrate to coalesce droplets in the emulsion.

In a second embodiment, the present disclosure provides the method of the first embodiment wherein at least one of the loaded organic solution or the concentrated acid solution exhibits a percent reduction in turbidity of at least 90% according to the Turbidity Test.

In a third embodiment, the present disclosure provides the method of the first or second embodiment, wherein at least one of the loaded organic solution or the concentrated acid solution exhibits a final turbidity of <100 NTU according to the Turbidity Test.

In a fourth embodiment, the present disclosure provides a method for aggregating droplets of an emulsion comprising an organic phase and an aqueous acidic phase, the method comprising:
  contacting a coalescer with a feed of the emulsion wherein the coalescer comprises;
    a housing;
    a coalescing element located in the housing, the coalescing element comprising at least one layer of a nonwoven web substrate; and
    a fluid inlet and a fluid outlet each in fluid communication with the coalescing element, wherein a $D_{50}$ droplet particle size in the emulsion is bigger by at least a factor of 3 upon flow out of the fluid outlet relative to the $D_{50}$ droplet particle size upon flow into the fluid inlet.

In a fifth embodiment, the present disclosure provides the method of the fourth embodiment, wherein the emulsion comprises a discontinuous organic solvent phase dispersed in a continuous aqueous acidic phase.

In a sixth embodiment, the present disclosure provides the method of the fourth embodiment, wherein the emulsion comprises a discontinuous aqueous acidic phase dispersed in a continuous organic solvent phase.

In a seventh embodiment, the present disclosure provides a method of coalescing droplets in an emulsion, the emulsion comprising:
  a continuous aqueous phase having a pH≤5 optionally containing copper ions, and
  an organic phase comprising a complex of a lixiviant and copper ions,
  the method comprising:
    contacting the emulsion with the a nonwoven web substrate.

In an eighth embodiment, the present disclosure provides the method of any one of the fourth to seventh embodiments, wherein the emulsion exhibits a percent reduction in turbidity of at least 90% according to the Turbidity Test after it contacts the nonwoven web substrate.

In a ninth embodiment, the present disclosure provides the method of any one of the fifth to eighth embodiments, wherein the emulsion exhibits a final turbidity of <100 NTU according to the Turbidity Test.

In a tenth embodiment, the present disclosure provides the method of any one of the first to ninth embodiments, wherein the nonwoven web substrate has a tensile strength of at least 4.0 newtons.

In an eleventh embodiment, the present disclosure provides the method of any one of the first to tenth embodiments, wherein the nonwoven web substrate has a surface area of 15 to 50 m$^2$ per square meter of nonwoven substrate.

In a twelfth embodiment, the present disclosure provides the method of any one of the first to eleventh embodiments, wherein the nonwoven web substrate has a mean pore size of 1 micrometer to 40 micrometers according to ASTM F 316-03 5.

In a thirteenth embodiment, the present disclosure provides the method of any one of the first to twelfth embodiments, wherein the nonwoven web substrate have a solidity of less than 20%.

In a fourteenth embodiment, the present disclosure provides the method of any one of the first to thirteenth embodiments, wherein the nonwoven web substrate comprises at least one of a spunlaid, spunbond, hydroentangled, or a meltblown nonwoven substrate.

In a fifteenth embodiment, the present disclosure provides the method of any one of the first to fourteenth embodiments, wherein the nonwoven web substrate has an effective fiber diameter in a range from 1 micrometer to 40 micrometers.

In a sixteenth embodiment, the present disclosure provides the method of any one of the first to fifteenth embodiments, wherein the nonwoven web substrate has an effective fiber diameter in a range from 1 micrometer to 15 micrometers.

In a seventeenth embodiment, the present disclosure provides the method of any one of the first to sixteenth embodiments, wherein the nonwoven web substrate includes fibers that have different effective fiber diameters.

In an eighteenth embodiment, the present disclosure provides the method of any one of the first to seventeenth embodiments, wherein the nonwoven web substrate is hydrophilic.

In a nineteenth embodiment, the present disclosure provides the method of the eighteenth embodiment, wherein the nonwoven web substrate comprises fibers of inherently hydrophilic polymers.

In a twentieth embodiment, the present disclosure provides the method of the nineteenth embodiment, wherein the inherently hydrophilic polymers are selected from polyamides and poly(vinyl alcohol).

In a twenty-first embodiment, the present disclosure provides the method of the eighteenth embodiment, wherein the nonwoven web substrate comprises a hydrophilic (co)polymer grafted to the surface of the fibers.

In a twenty-second embodiment, the present disclosure provides the method of the twenty-first embodiment, wherein the grafted (co)polymer comprises cationic, anionic or nonionic hydrophilic monomer units.

In a twenty-third embodiment, the present disclosure provides the method of the twenty-first or twenty-second embodiment, wherein the weight of the grafted polymer is 0.5 to 3 times the weight of the nonwoven web substrate.

In a twenty-fourth embodiment, the present disclosure provides the method of any one of the first to twenty-third embodiment, wherein the nonwoven web substrate has a surface energy of at least 35 dyne/cm.

In a twenty-fifth embodiment, the present disclosure provides the method of any one of the first to twenty-third embodiments, wherein the nonwoven web is grafted with a poly(hexafluoropropylene oxide) monomer.

In a twenty-sixth embodiment, the present disclosure provides the method of any one of the first to twenty-third embodiments, wherein the nonwoven web substrate has a surface energy of less than 35 dyne/cm.

In a twenty-seventh embodiment, the present disclosure provides the method of any one of the first to twenty-sixth embodiments, wherein the emulsion further comprises a copper lixiviant complex.

In a twenty-eighth embodiment, the present disclosure provides the method of any one of the first to twenty-seventh embodiments, wherein the nonwoven web is instantly wet according to the Wetting Test.

In a twenty-ninth embodiment, the present disclosure provides the method of any one of the first to twenty-seventh embodiments, wherein the nonwoven web substrate comprises two or more layers of nonwoven webs.

In a thirtieth embodiment, the present disclosure provide the method of the twenty-ninth embodiment, wherein at least two of the two or more layers of nonwoven webs have different effective fiber diameters.

In a thirty-first embodiment, the present disclosure provides a coalescing element comprising a nonwoven web substrate for aggregating droplets of an emulsion comprising an aqueous acidic phase and organic solvent phase, wherein a discontinuous phase is dispersed in an continuous phase, wherein either the organic solvent phase or the aqueous acidic phase may be the continuous phase.

In a thirty-second embodiment, the present disclosure provides use of a nonwoven web substrate as a coalescing element for aggregating droplets of an emulsion comprising an aqueous acidic phase and organic solvent phase, wherein a discontinuous phase is dispersed in an continuous phase, wherein either the organic solvent phase or the aqueous acidic phase may be the continuous phase.

In a thirty-third embodiment, the present disclosure provides the coalescing element or use of the thirty-first or thirty-second embodiment, wherein the nonwoven web substrate has a tensile strength of at least 4.0 newtons.

In a thirty-fourth embodiment, the present disclosure provides the coalescing element or use of any one of the thirty-first to thirty-third embodiments, wherein the nonwoven web substrate has a surface area of 15 to 50 $m^2$ per square meter of nonwoven substrate.

In a thirty-fifth embodiment, the present disclosure provides the coalescing element or use of any one of the thirty-first to thirty-fourth embodiments, wherein the nonwoven web substrate has a mean pore size of 1 micrometer to 40 micrometer according to ASTM F 316-03 5.

In a thirty-sixth embodiment, the present disclosure provides the coalescing element or use of any one of the thirty-first to thirty-fifth embodiments, wherein the nonwoven web substrate have a solidity of less than 20%.

In a thirty-seventh embodiment, the present disclosure provides the coalescing element or use of any one of the thirty-first to thirty-sixth embodiments, wherein the nonwoven web substrate comprises at least one of a spunlaid, spunbond, hydroentangled, or a meltblown nonwoven web substrate.

In a thirty-eighth embodiment, the present disclosure provides the coalescing element or use of any one of the thirty-first to thirty-seventh embodiments, wherein the nonwoven web substrate has an effective fiber diameter in a range from 1 micrometer to 40 micrometers.

In a thirty-ninth embodiment, the present disclosure provides the coalescing element or use of any one of the thirty-first to thirty-eighth embodiments, wherein the nonwoven web substrate has an effective fiber diameter in a range from 1 micrometer to 15 micrometers.

In a fortieth embodiment, the present disclosure provides the coalescing element or use of any one of the thirty-first to thirty-ninth embodiments, wherein the nonwoven web substrate includes fibers that have different effective fiber diameters.

In a forty-first embodiment, the present disclosure provides the coalescing element or use of any one of the thirty-first to fortieth embodiments, wherein the nonwoven web substrate is hydrophilic.

In a forty-second embodiment, the present disclosure provides the coalescing element or use of the forty-first embodiment, wherein the nonwoven web substrate comprises fibers of inherently hydrophilic polymers.

In a forty-third embodiment, the present disclosure provides the coalescing element or use of the forty-second embodiment, wherein the inherently hydrophilic polymers are selected from polyamides and poly(vinyl alcohol).

In a forty-fourth embodiment, the present disclosure provides the coalescing element or use of the forty-first embodiment, wherein the nonwoven web substrate comprises a hydrophilic (co)polymer grafted to the surface of the fibers.

In a forty-fifth embodiment, the present disclosure provides the coalescing element or use of the forty-fourth embodiment, wherein the grafted (co)polymer comprises cationic, anionic, or nonionic hydrophilic monomer units.

In a forty-sixth embodiment, the present disclosure provides the coalescing element or use of the forty-fourth or forty-fifth embodiment, wherein the weight of the grafted polymer is 0.5 to 3 times the weight of the nonwoven web substrate.

In a forty-seventh embodiment, the present disclosure provides the coalescing element or use of any one of the thirty-first to forty-sixth embodiments, wherein the nonwoven web substrate has a surface energy of at least 35 dyne/cm.

In a forty-eighth embodiment, the present disclosure provides the coalescing element or use of any one of the thirty-first to forty-sixth embodiments, wherein the nonwoven web is grafted with a poly(hexafluoropropylene oxide) monomer.

In a forty-ninth embodiment, the present disclosure provides the coalescing element or use of any one of the thirty-first to forty-sixth embodiments, wherein the nonwoven web substrate has a surface energy of less than 35 dyne/cm.

In a fiftieth embodiment, the present disclosure provides the coalescing element or use of any one of the thirty-first to forty-ninth embodiments, wherein the nonwoven web is instantly wet according to the Wetting Test.

In a fifty-first embodiment, the present disclosure provides the coalescing element or use of any one of the thirty-first to fiftieth embodiments, wherein the nonwoven web substrate comprises two or more layers of nonwoven webs.

In a fifty-second embodiment, the present disclosure provides the coalescing element or use of the fifty-first embodiment, wherein at least two of the two or more layers of nonwoven webs have different effective fiber diameters.

In a fifty-third embodiment, the present disclosure provides the coalescing element or use of any one of the thirty-first to fifty-second embodiments, wherein the emulsion comprises a discontinuous organic solvent phase and a continuous aqueous acidic phase.

In a fifty-fourth embodiment, the present disclosure provides the coalescing element or use of any one of the thirty-first to fifty-second embodiments, wherein the emulsion comprises a discontinuous aqueous acidic phase and a continuous organic solvent phase.

In a fifty-fifth embodiment, the present disclosure provides the coalescing element or use of any one of the thirty-first to fifty-fourth embodiments, wherein the emulsion further comprises a copper lixiviant complex.

In a fifty-sixth embodiment, the present disclosure provides the coalescing element or use of any one of the thirty-first to fifty-fifth embodiments, wherein the emulsion exhibits a percent reduction in turbidity of at least 90% according to the Turbidity Test.

In a fifty-seventh embodiment, the present disclosure provides the coalescing element or use of any one of the thirty-first to fifty-sixth embodiments, wherein the emulsion exhibits a final turbidity of <100 NTU according to the Turbidity Test.

In a fifty-eighth embodiment, the present disclosure provides a coalescing article for aggregating droplets of an emulsion comprising an aqueous acidic phase and organic solvent phase, the coalescing article comprising:
a source of the emulsion;

a coalescer that receives the emulsion, the coalescer comprising:
a housing;
a coalescing element located in the housing, the coalescing element comprising a nonwoven web substrate;
a fluid inlet and a fluid outlet, each in fluid communication with the coalescing element; and
a process tank that receives flow from the coalescer.

In a fifty-ninth embodiment, the present disclosure provides the coalescing article of the fifty-eighth embodiment, wherein the coalescing element is the coalescing element of any one of the thirty-first to fifty-seventh embodiments.

In a sixtieth embodiment, the present disclosure provides the coalescing article of the fifty-eighth or fifty-ninth embodiment, further comprising a pre-filter that receives the emulsion from the source and supplies a filtered flow to the coalescer.

The following specific, but non-limiting, examples will serve to illustrate the present disclosure.

EXAMPLES through one or more layers of the media held in a filtration funnel and filtered at a slight vacuum. Initial and filtered turbidity as well as the filtration time are recorded.

Reagents

A synthetic copper electrolyte solution was prepared by adding 300 mL (340 grams) of a 20% wt/vol solution of copper sulfate in water (Ricca Chemical Company) to a 1000-mL tri-pour beaker followed by 95 grams of 95-98% sulfuric acid (Sigma Aldrich). Deionized water was then added to the beaker to bring the total volume to 600 mL (685 grams).

A "Loaded Solvent Extraction Organic" was prepared by adding 160 mL of "ORFOM SX 80" hydrocarbon solvents (Chevron Phillips, Woodlands, Tex.) and 40 mL of "LIX 84-I" (2-hydroxy-5-nonylacetophenone oxime in a high flash point hydrocarbon diluent, BASF, Florham Park, N.J.) to a 1000-mL separatory funnel. 200 mL of the previously prepared synthetic copper electrolyte solution was added to the separatory funnel, the funnel was stoppered and shaken for 60 seconds. The 2 phases were allowed to separate for 10 minutes and then the lower aqueous phase was drained off and discarded. The upper organic phase was drained to a 500-mL HDPE bottle.

| Material | Source |
|---|---|
| Agmatine sulfate | Aldrich, Milwaukee, WI |
| 2-isocyanatoethyl 2-methylacrylate | Showa Denko KK, Kanagawa, Japan |
| Ethanolamine | Alfa Aesar, Ward Hill, MA |
| Vinyldimethylazlactone (VDM)) | SNPE, Princeton, NJ |
| 1-Amino-2-propanol | Aldrich, Milwaukee, WI |
| 2-Acrylamido-2-methylpropane sulfonic acid 50% solution in water (AMPS) | Aldrich, Milwaukee, WI |
| Dioctyl sodium sulfosuccinate (DOS) | Alfa Aesar, Ward Hill, MA |
| N-vinyl pyrrilodone (NVP) | TCI, Portland, Oregon |
| Glycidal methacrylate (GMA) | TCI, Portland, Oregon |
| Methacrylamidopropyltrimethylammonium chloride (MAPTAC)-50% solution in water | Aldrich, Milwaukee, WI |
| Hexafluoropropylene oxide methacrylate (HFPO-MA). $F[CF(CF_3)CF_2O]_{6.3}CF(CF_3)C(O)N(H)CH_2CH_2OC(O)C(CH_3)=CH_2$ | "HFPO-MA" refers to the methacrylic acid ester of an oligomeric hexafluoropropylene oxide alcohol made as described in Preparative Example 3 of US20050137355. |
| N-vinyl formamide (NVF) | Aldrich, Milwaukee, WI |
| Hydroxyethyl acrylamide | Aldrich, Milwaukee, WI |
| Dimethyhexadecylaminoethyl acrylate bromide (DMHAEABr) | Prepared by quaternizing dimethylaminoethyl acrylate. The dimethylaminoethyl acrylate was obtained from Aldrich, Milwaukee, WI |

Test Methods

Coalescing Challenge Test

This test is a modification of a published BASF test entitled "Standard Quality Control Test of LIX® Reagents". The BASF test is a standard quality control test for solvent extraction reagents that form insoluble complexes with various metal cations (LIX® Reagents). The test is used for evaluating non-woven media for the ability to coalesce an organic copper chelate complex entrained in an aqueous continuous phase. The level of entrainment is measured by turbidity [Nephelometric Turbidity Units (NTUs)]. Challenge solution is of sufficient turbidity and stability to maintain a threshhold turbidity of at least 500 NTU for the duration of the test period. The challenge solution is then run A "Leach Solution" was prepared by adding 750 mL of deionized water and 75 mL of a 20% (wt/vol) solution of copper sulfate (Ricca Chemical Company) to a 1000-mL Tripour beaker. To this was added 10.0 grams of 95-98% sulfuric acid (Sigma Aldrich, St. Louis, Mo.) and 9.1 grams of iron (III) sulfate pentahydrate (Sigma Aldrich, St. Louis, Mo.). The solution was then stirred for 10 minutes, poured into a 1000-mL volumetric flask and de-ionized water added to the 1000 mL mark.

Procedure

The test vessel used was a baffled, glass mixing vessel fabricated from heavy wall glass tubing 15 cm high by 10 cm wide with a bottom take-off valve made from glass tubing. The walls of the vessel were modified to include 4 baffles that protrude 1 cm into the vessel space. The mixer was a Cole-Parmer Model 04555-25 variable speed mixer with stand. The mixer impeller (3 cm above vessel bottom) was polypropylene (1.75 inches in diameter with 6 slots, 0.125 inches deep and 0.125 inches wide, the top of the hub was 1 cm above the top of the impeller, and the shaft was 316 stainless steel, 10 cm long). 450 of the "Leach Solution" was added to the test vessel followed by 135 ml of the "Loaded Solvent Extraction Organic" (0.3:1 organic: aqueous ratio). The stirrer was started at a preset speed of 2000 rpm and the mixture stirred at that speed for precisely 3 minutes. The stirrer was stopped and phases allowed to separate for 5 minutes. Draining of the lower aqueous phase was begun to a 1000-ml Tripour beaker and after 150-ml of the aqueous phase was drained the draining was stopped and a glass vial was filled for a turbidity sample. The vial challenge solution initial turbidity was measured ("HI 88713" Turbidity Meter, Hanna, Woonscoket, R.I.) and recorded. The rest of the aqueous phase was drained into the Tripour beaker. One or more layers of test nonwoven media (47 mm disc) was placed in a filter holder (500-ml Pall Corporation 47-mm Magnetic Filter Funnel) over a 1000-ml glass KIMAX filtration flask. The flask was attached to a vacuum pump (Barnant Model 400-3901 Vacuum/Pressure Station) operating at 5 mm Hg (667 Pa). 450 ml of the drained challenge solution was added to the filter holder, the vacuum and stopwatch was started and the time for the solution to drain was recorded. A sample of the aqueous phase in the filtration flask was added to a glass vial and the turbidity measured as with the initial sample.

Three different discs (47 mm) and 3 freshly made up solutions were used to test the reproducibility of the "Coalescing Challenge Test". The media discs were similar to those of Example 7 but of a larger effective fiber diameter. Results below:

| Initial turbidity (NTU) | Final turbidity (NTU) | Filtration time (sec) |
|---|---|---|
| 456 | 132 | 20 |
| 421 | 143 | 19 |
| 429 | 139 | 22 |

Wetting Test

A single layer of test nonwoven media (47 mm disc) was weighed and then placed in a filter holder (500-ml Pall Corporation 47-mm Magnetic Filter Funnel) over a 1000-ml glass KIMAX filtration flask. The flask was attached to a vacuum pump (Barnant Model 400-3901 Vacuum/Pressure Station) operating at 5 mm Hg (667 Pa). 450 ml of the "Leach Solution" was added to the filter holder, and a vacuum was pulled until all the liquid was filtered (time varied for each solution). The media was removed from the funnel and placed between 2 pieces of filter paper (Whatman #4 filter paper, 7.0 cm) under a 850 g (40 mm wide by 58 mm high) cylindrical weight for 15 seconds to remove excess liquid. The media was then weighed on an analytical balance and the weight recorded. The media was then placed on a piece of dry filter paper (Whatman #4 filter paper, 7.0 cm). A syringe (1 mL Becton Dickenson Luer-Lok) was filled with "Leach Solution" and 10 drops were placed randomly and uniformly (as quickly as possible and all within less than 5 seconds) on the 47 mm nonwoven test disc. A stopwatch was immediately started when the last drop was placed and the time recorded until all 10 drops had completed wetted out on the nonwoven. If the drops wetted in less than one second it was recorded as "instant wetting" or "I" as recorded in Table 2. If the drops had still not wetted after 300 seconds it was simply recorded as >300 in Table 2. The test was repeated exactly the same way for each test piece of nonwoven using 10 drops of "Loaded Solvent Extraction Organic". Results are in Table 2 where "A" refers to wet time for the aqueous "Leach Solution" and "O" refers to the organic "Loaded Solvent Extraction Organic" solution.

Three different discs (47 mm) were used to test the reproducibility of the "Wetting Test". The media discs were those of Example 18. Results below:

| Initial weight (g) | Wet weight (g) | Aqueous wetting time (sec) A | Organic wetting time (sec) O |
|---|---|---|---|
| 0.4584 | 0.9369 | 67 | <5 |
| 0.5194 | 1.1468 | 54 | <5 |
| 0.4831 | 1.1426 | 75 | <5 |

Nonwoven Preparation
Polypropylene (PP) Nonwoven

The polypropylene nonwoven was made by a meltblown process, which was formed by extruding the molten thermoplastic material ("3860X" polypropylene homopolymer from Total Petrochemicals, Houston, Tex.) through a plurality of fine, die capillaries as molten threads or filaments into a high velocity, usually heated gas stream which attenuates the filaments of molten thermoplastic material to reduce their diameter. Thereafter, the meltblown fibers are carried by a high velocity gas stream and are deposited on a collecting surface to form a web of randomly disbursed meltblown fibers. The microfibers of the nonwoven substrate had an effective fiber diameter (EFD) of 4.5 or 10.7 micrometers with respective basis weights of 60 or 90 g/m$^2$ respectively.
PET Nonwoven The PET polyester spunbond fiber web was purchased from Reemay, under the tradename "REEMAY 2033" from Fiberweb Filtrations, Old Hickory, Tenn. The nonwoven had an EFD of 23.2 microns and a basis weight of 102 g/m$^2$.
Polylactic Acid Nonwoven The polylactic acid nonwoven was made by a meltblown process as described for "Polypropylene (PP) Nonwoven" but using "INGEO 6252D" pellets (Natureworks LLC, Minnetonka, Minn.). The web had an EFD of 12.4 microns and basis weight of 40 g/m$^2$.
"B-24" Nylon Nonwoven "B-24" nylon-6 polymer (BASF Corporation Engineering Plastics Wyandotte, Mich.) was used to produce meltblown nonwoven substrate. The melt temperature was 295° C. with a mass flow rate of 0.25 grams/hole/minute on a standard meltblowing drilled orifice die. Hot air at 350° C. and 975 cubic feet per minute (SCFM) (27.8 cubic meters per minute (CMM)), per meter of die width, was used to attenuate the fibers. The fibers with a face velocity at impact of 1200 meters per minute (m/min) were collected 0.30 meters from the die on a foraminous stainless steel belt and were bonded under 200° C. air drawn through the web at a face velocity of 137 m/min for 0.14 seconds, followed by cooling air at 29° C., at the same face velocity, for 0.8 seconds. The collected web had a thickness of 0.4 mm before calendaring between two 25 cm diameter smooth steel rolls set at 82° C., running at 1.5 m/min with a nip pressure of 170 Newtons per lineal centimeter of web (N/lcm). The resulting web thickness was 0.25 mm. The collected web basis weight was 48 g/m² and the web had an EFD of 4.1 microns.

PET/Copolyolefin/Glass Microfiber

20% by weight "TREVIRA 255" core sheath bicomponent polyethylene terephthalate(PET)/copolyolefin fiber (Trevira, Bobingen, Germany) and 80% by weight "100 CX Micro-Strand Glass Microfiber" staple fiber (Johns Manville, Denver, Colo.) were used to make a nonwoven. The web basis weight was 200 g/m². The glass microfiber BET fiber diameter was 5.5 microns per manufacturer specs.

Polymer Preparation

VDM-Ethanolamine (2-Aminoethanol Adduct of Vinyldimethylazlactone (VDM))

VDM was dissolved in ethyl acetate (1 gram/20 mL) in a round bottomed flask and the mixture was stirred magnetically at 20° C. One equivalent of 2-aminoethanol was added by syringe and within 10 minutes a copious colorless precipitate formed. Stirring was continued for a total of 30 minutes and then diethyl ether (20 mL) was added. The solid was filtered, washed with diethyl ether (20 mL), and dried. Yield, approximately 85%. ¹H-NMR (D₂O): δ 1.34 (s, 6H), 3.19 (t, 2H), 3.48 (t, 2H), 5.62 (d, 1H), 6.06 (d, 1H), 6.13 (dd, 1H).

IEM-Agmatine (4-(2-(Methacryloyloxy)Ethylamino)Butyl Guanidinium Sodium Sulfate)

Agmatine sulfate (100 g, 397 mmol) was dissolved in 400 mL of aqueous 1.00 N NaOH. Acetone (200 mL) was then added and the stirred mixture was cooled to 10° C. in a cold water bath. An additional 80 mL of water was added to keep the agmatine sulfate in solution. 2-Isocyanatoethyl 2-methylacrylate (58.0 mL, 411 mmol) was then added to the reaction mixture, via an addition funnel, over a period of 30 min. After stirring an additional 45 min, the reaction mixture was placed on a rotary evaporator at 20° C. After pulling off most of the acetone, the reaction mixture was transferred to a separatory funnel and washed with ethyl acetate (2×250 mL) and methylene chloride (2×200 mL). The remaining aqueous solution was adjusted to pH 7 by addition of a small amount of dilute sulfuric acid and then placed on a rotary evaporator at 20° C. to draw off any remaining volatiles. Lyophilization yielded the title compound (162 g) as a white powder. ¹H NMR (500 MHz, D₂O) □ 6.14 (s, 1H), 5.73 (s, 1H), 4.23 (t, J=5.2 Hz, 2H), 3.45 (t, J=5.4 Hz, 2H), 3.18 (t, J=7.0 Hz, 2H), 3.12 (t, J=6.4 Hz, 2H), 1.22 (s, 3H), 1.61-1.48 (m, 4H).

Electron Beam Grafting Procedure

The nonwoven substrate was cut into a 12"×17" (30 cm×46 cm) sheet (8.0 g for 0 60 g/m² web and 13.5 g for 90 g/m² web) and purged of oxygen in a nitrogen inerted glovebox (<50 ppm O₂). The inerted substrate was place in a sealed plastic bag, before removing from the glovebox. The inerted substrate in the sealed bag was conveyed through the beam on a web carrier. The irradiations were done on an ESI CB-300 electron beam (ESI "ELECTROCURE" EB SYSTEM from Energy Sciences, Inc., Wilmington, Mass.), at an accelerating voltage of 300 keV delivering a dose of 50 kGy using the monomers shown in Table 1 (except that Examples 1-4 and 19 did not use electron beam radiation and were ungrafted nonwovens). After irradiation the sealed bags were brought back into the nitrogen purged glovebox, opened and imbibed with the monomer solution, with the composition shown in Table 1. The coated substrate was allowed to react overnight (>14 hours) in the purged glovebox. The nonwoven samples were then removed from the bag and rinsed with water using a vacuum plate to pull the water through and allowed to air dry. The air dried sheet was weighed to determine grafting efficiency of the available monomer. The nonwoven samples were then "blanched" in boiling water for one hour. The samples are then cooled by placing them in a water tray and again air dried. Dry 47 mm disks were punched out of the nonwoven sheets and used for testing. Table 3 indicates the weight of grafted polymer which was obtained by subtracting the initial dry ungrafted web weight from the final dry grafted web weight.

EXAMPLES

Example 1 is an ungrafted 4.5 effective fiber diameter (EFD in microns), 90 g/m² polypropylene web, shown in Table 2, made via the melt-blown process described under "Polypropylene Nonwoven".

Example 2 is an ungrafted 4.5 EFD, 50 g/m² nylon web, shown in Table 2, made via melt-blown process described under "B-24" Nylon Nonwoven.

Example 3 is an ungrafted 23.2 EFD, 102 g/m² polyethyleneterephthalate (PET) spunbond web described under "PET Nonwoven".

Example 4 is an ungrafted 12.4 EFD, 40 g/m² polylactic acid web described under "Polylactic Acid Nonwoven".

Example 5 used a 10.7 EFD, 60 g/m² polypropylene web, shown in Table 2 made via the melt blown process described under "Polypropylene Nonwoven". The monomers (Table 2) were then covalently reacted (grafted) to the surface of the nonwoven as described under "ELECTRON BEAM GRAFTING PROCEDURE".

Example 6 was identical to Example 5 but used a 4.5 EFD polypropylene fiber.

Examples 7-17 all used the 4.5 EFD polypropylene fiber of Example 1 with either 60 or 90 g/m² as shown in Table 2. All these examples were grafted with electron beam radiation as described under "ELECTRON BEAM GRAFTING PROCEDURE".

TABLE 1

Electron Beam Grafting Solution Compositions

| | Water | DOS | NVP | NVF | GMA | MAPTAC | AMPS | Other monomers |
|---|---|---|---|---|---|---|---|---|
| EX5 | 59.7 | 0.30 | 9.00 | 0 | 0 | 3.90 | 2.10 | 0 |
| EX6 | 59.7 | 0.30 | 9.00 | 0 | 0 | 3.90 | 2.10 | 0 |
| EX7 | 81.4 | 0 | 11.7 | 0 | 4.85 | 0 | 0 | VDM-ethanol-amine 7.05 |
| EX8 | 63.7 | 0.30 | 0 | 16 | 0 | 0 | 0 | 0 |
| EX9 | 80.9 | 0 | 11.7 | 0 | 5.20 | 0 | 0 | Hydroxyethyl-acrylamide 7.20 |
| EX10 | 63.7 | 0.3 | 16 | 0 | 0 | 0 | 0 | 0 |
| EX11 | 43.0 | 0 | 8.00 | 0 | 8.00 | 0 | 16.0 | 0 |
| EX12 | 74.5 | 0 | 11.7 | 0 | 4.70 | 14.1 | 0 | 0 |

TABLE 1-continued

Electron Beam Grafting Solution Compositions

| | Water | DOS | NVP | NVF | GMA | MAPTAC | AMPS | Other monomers |
|---|---|---|---|---|---|---|---|---|
| EX13 | 46.8 | 0 | 8.00 | 0 | 9.00 | 7.80 | 4.20 | HFPO-MA 0.25 |
| EX14 | 59.2 | 0.30 | 9.00 | 0 | 0 | 3.90 | 2.10 | |
| EX15 | 58.7 | 0.30 | 9.00 | 0 | 0 | 3.90 | 2.10 | HFPO-MA 1.00 |
| EX16 | 57.7 | 0.30 | 9.00 | 0 | 0 | 3.90 | 2.10 | HFPO-MA 1.00 |
| EX17 | 81.6 | 0 | 11.7 | 0 | 4.70 | 0 | 0 | IEM-agmatine 7.05 |
| EX18 | 51 | 0 | 8.00 | 8.00 | 0 | 0 | 0 | DMHAEABr 8.00 |

TABLE 2

Nonwoven Characterization and Test Results

| | Nonwoven Description | EFD micron | g/m2 | Wet time (A/O) (sec) | # discs | Start NTU | End NTU | Filter time (sec) |
|---|---|---|---|---|---|---|---|---|
| EX1 | Ungrafted Polypropylene (PP) | 4.5 | 90 | >300/I | 2 | 716 | 43 | 26 |
| EX2 | Ungrafted Nylon (B24) | 4.5 | 50 | I/I | 3 | 566 | 11 | 24 |
| EX3 | Ungrafted PET | 23.2 | 102 | I/I | 4 | 635 | 148 | 7 |
| EX4 | Ungrafted Polylactic acid | 12.4 | 40 | >300/I | 3 (6) | 738 (743) | 381 (282) | 7 (10) |
| EX5 | PP grafted with NVP, MAPTAC, AMPS | 10.7 | 60 | I/I | 2 | 601 | 65 | 9 |
| EX6 | PP grafted with NVP, MAPTAC, AMPS | 4.5 | 60 | I/I | 2 | 798 | 12 | 72 |
| EX7 | PP grafted with NVP, GMA, VDM-ethanolamine | 4.5 | 90 | I/I | 2 | 740 | 6 | 29 |
| EX8 | PP grafted with NVF | 4.5 | 60 | NM | 2 | 696 | 3 | 31 |
| EX9 | PP grafted with NVP, GMA, hydroxyethylacrylamide | 4.5 | 90 | I/I | 1 | 717 | 3 | 57 |
| EX10 | PP grafted with NVP | 4.5 | 60 | I/I | 2 | 681 | 15 | 37 |
| EX11 | PP grafted with NVP, GMA, AMPS | 4.5 | 60 | I/I | 2 | 700 | 8 | 118 |
| EX12 | PP grafted with NVP, GMA, MAPTAC | 4.5 | 90 | NM | 1 | 578 | 5 | 149 |
| EX13 | PP grafted with NVP, GMA, MAPTAC, AMPS, 0.25 HFPO-MA | 4.5 | 60 | I/I | 1 | 775 | 7 | 33 |
| EX14 | PP grafted with NVP, GMA, MAPTAC, AMPS, 0.50 HFPO-MA | 4.5 | 60 | NM | 2 | 681 | 5 | 16 |
| EX15 | PP grafted with NVP, GMA, MAPTAC, AMPS, 1.0 HFPO-MA | 4.5 | 60 | NM | 2 | 753 | 8 | 19 |
| EX16 | PP grafted with NVP, GMA, MAPTAC, AMPS, 2.0 HFPO-MA | 4.5 | 60 | NM | 2 | 736 | 5 | 39 |
| EX17 | PP grafted with IEM-agmatine | 4.5 | 90 | I/I | 2 | 785 | 8 | 57 |
| EX18 | PP grafted with DMHAEABr | | 60 | 67/I | 2 | 663 | 16 | 67 |
| EX19 | PET/Copyolefin/Glass Microfiber | | 200 | I/I | 1 | 602 | 90 | 29 |

"# discs" refers to the # of 47 mm nonwoven discs used in the "Coalescing Challenge Test"
Basis weights (g/m²) were all calculated according to the method set forth in Davies, C. N., "The Separation of Airborne Dust and Particles," Institution of Mechanical Engineers, London, Proceedings 1B, 1952.

TABLE 3

Electron Beam Grafting Results

| | Nonwoven Description | Weight of grafted polymer (g) | % monomer grafted |
|---|---|---|---|
| EX1 | Ungrafted Polypropylene (PP) | 0 | 0 |
| EX2 | Ungrafted Nylon (B24) | 0 | 0 |
| EX3 | Ungrafted PET | 0 | 0 |
| EX4 | Ungrafted Polylactic acid | 0 | 0 |

TABLE 3-continued

Electron Beam Grafting Results

| Nonwoven Description | | Weight of grafted polymer (g) | % monomer grafted |
|---|---|---|---|
| EX5 | PP grafted with NVP, MAPTAC, AMPS | 6.60 | 100 |
| EX6 | PP grafted with NVP, MAPTAC, AMPS | 12.7 | 100 |
| EX7 | PP grafted with NVP, GMA, VDM-ethanolamine | 23.7 | 100 |
| EX8 | PP grafted with NVF | 11.6 | 73 |
| EX9 | PP grafted with NVP, GMA, hydroxyethylacrylamide | 27.4 | 92 |
| EX10 | PP grafted with NVP | 8.40 | 87 |
| EX11 | PP grafted with NVP, GMA, AMPS | 24.8 | 100 |
| EX12 | PP grafted with NVP, GMA, MAPTAC | 29.5 | 100 |
| EX13 | PP grafted with NVP, GMA, MAPTAC, AMPS, 0.25 HFPO-MA | 22.3 | 99 |
| EX14 | PP grafted with NVP, GMA, MAPTAC, AMPS, 0.50 HFPO-MA | 11.1 | 89 |
| EX15 | PP grafted with NVP, GMA, MAPTAC, AMPS, 1.0 HFPO-MA | 12.0 | 92 |
| EX16 | PP grafted with NVP, GMA, MAPTAC, AMPS, 2.0 HFPO-MA | 7.5 | 93 |
| EX17 | PP grafted with IEM-agmatine | 30.1 | 100 |
| EX18 | PP grafted with DMHAEABr | 28.8 | 100 |
| EX19 | PET/Copyolefin/Glass Microfiber | 0 | 0 |

For the following Examples 20 to 27, nonwoven disc substrates having effective fiber diameters (EFD) of 27 micrometers, 14 micrometers, 8 micrometers, and 38 micrometers were made from polypropylene according to the Nonwoven Preparation method "Polypropylene (PP) Nonwoven" described above. The "B-24" Nylon Nonwoven was also used for some of the Examples, below. The designation "p" in Table 4, below, indicates that the "B-24" Nylon Nonwoven and the 8-micrometer-EFD polypropylene nonwoven discs were manually punched with an 18 gauge needle. To perform the hole punching, the 18 gauge needle was first passed through the flame of a Bunsen burner, and then the needle was punched through the nonwoven disc. For the "B-24" nylon nonwoven disc designated "4p", 40 holes were made in the disc. For the 8-micrometer-EFD polypropylene nonwoven disc designated "8p", nine holes were made in the disc.

In Table 4, below, more than one nonwoven disc was used. The "Media Configuration" describes the number of nonwoven discs, the EFD of the nonwoven in the discs, and the arrangement of the discs used for each Example. The numbers in parenthesis indicate the results from a duplicate test.

TABLE 4

Nonwoven Characterization and Test Results

| | Media Configuration: # Layers × EFD in micrometers | Pass # | Filter time (sec) | NTU |
|---|---|---|---|---|
| EX20 | 2 × 27, 2 × 14, 1 × 8, 1 × 8 | 0 | | 536 |
| | | 1 | 33 | 20.6 |
| | | 2 | 26 | 11.0 |
| | | 3 | 24 | 7.5 |
| EX21 | 2 × 27, 2 × 14, 1 × 8, 2 × 27, 2 × 14, 1 × 8 | 0 | | 568(571) |
| | | 1 | 30(34) | 12.8(16.6) |
| | | 2 | 26(30) | 8.8(9.6) |
| | | 3 | 26(28) | 5.4(6.6) |
| EX3 | 2 × 27, 2 × 27, 2 × 14, 2 × 14, 1 × 8, 1 × 4 p | 0 | | 780 |
| | | 1 | 35(29) | 4.0(5.9) |
| | | 2 | 35(31) | 3.5(3.5) |
| EX4 | 2 × 27, 2 × 27, 2 × 14, 2 × 14, 1 × 8 p, 1 × 4 p | 0 | | 735 |
| | | 1 | 22 | 14.2 |
| | | 2 | 22 | 6.5 |

TABLE 4-continued

Nonwoven Characterization and Test Results

| | Media Configuration: # Layers × EFD in micrometers | Pass # | Filter time (sec) | NTU |
|---|---|---|---|---|
| EX5 | 2 × 27, 2 × 14, 1 × 8, 1 × 4 p | 0 | | 641 |
| | | 1 | 24 | 13.2 |
| | | 2 | 21 | 6.5 |
| EX6 | 9 × 38 | 0 | | 371 |
| | | 1 | 14 | 144 |
| | | 2 | 13 | 102 |
| | | 3 | 13 | 70 |
| EX7 | 2 × 27, 2 × 14, 1 × 8, 1 × 8 | 0 | | 536 |
| | | 1 | 33 | 20.6 |
| | | 2 | 26 | 11.0 |
| | | 3 | 24 | 7.5 |
| EX8 | 2 × 27, 2 × 14, 1 × 8, 2 × 27, 2 × 14, 1 × 8 | 0 | | 568 |
| | | 1 | 30 | 12.8 |

This disclosure is not limited to the above-described embodiments but is to be controlled by the limitations set forth in the following claims and any equivalents thereof. This disclosure may be suitably practiced in the absence of any element not specifically disclosed herein.

What is claimed is:

1. A method of coalescing droplets in an emulsion, the emulsion comprising:
   a continuous aqueous phase having a pH≤5 optionally containing copper ions, and
   an organic phase comprising a complex of a lixiviant and copper ions, the method comprising contacting the emulsion with a nonwoven web substrate.

2. The method of claim 1, further comprising:
   contacting a coalescer with the emulsion, wherein the coalescer comprises:
   a housing;
   a coalescing element comprising the nonwoven web substrate located in the housing; and
   a fluid inlet and a fluid outlet each in fluid communication with the coalescing element,
   wherein a $D_{50}$ droplet particle size is bigger by at least a factor of 3 upon flow out of the fluid outlet relative to the $D_{50}$ droplet particle size upon flow into the fluid inlet.

3. The method of claim 2, wherein the nonwoven web substrate comprises at least one of a spunlaid, spunbond, hydroentangled, or a meltblown nonwoven web substrate.

4. The method of claim 2, wherein the nonwoven web substrate has an effective fiber diameter of 1 micrometer to 40 micrometers.

5. The method of claim 4, wherein the nonwoven web substrate includes fibers that have different effective fiber diameters.

6. The method of claim 4, wherein the nonwoven web substrate is hydrophilic.

7. The method of claim 6, wherein the nonwoven web substrate comprises a hydrophilic polymer or hydrophilic copolymer covalently bonded to the surface of its fibers.

8. The method of claim 2, wherein the nonwoven web substrate comprises two or more layers of nonwoven webs.

9. The method of claim 8, wherein at least two of the two or more layers of nonwoven webs have different effective fiber diameters.

10. The method of claim 1, wherein the nonwoven web substrate comprises at least one of a spunlaid, spunbond, hydroentangled, or a meltblown nonwoven web substrate.

11. The method of claim 1, wherein the nonwoven web substrate has an effective fiber diameter of 1 micrometer to 40 micrometers.

12. The method of claim 1, wherein the nonwoven web substrate includes fibers that have different effective fiber diameters.

13. The method of claim 1, wherein the nonwoven web substrate is hydrophilic.

14. The method of claim 13, wherein the nonwoven web substrate comprises a hydrophilic polymer or hydrophilic copolymer covalently bonded to the surface of its fibers.

15. The method of claim 1, wherein the nonwoven web substrate comprises two or more layers of nonwoven webs.

16. The method of claim 15, wherein at least two of the two or more layers of nonwoven webs have different effective fiber diameters.

17. The method of claim 1, wherein the emulsion has an organic solvent phase to aqueous acidic phase in a ratio of 1:1 to 1.5:1.

18. The method of claim 1, wherein the nonwoven web substrate has a surface energy of less than 35 dyne/cm.

19. The method of claim 1, wherein the nonwoven web substrate comprises fibers of inherently hydrophilic polymers selected from the group consisting of polyamides and poly(vinyl alcohol).

20. The method of claim 1, wherein the nonwoven web substrate has a solidity of less than 20%.

* * * * *